United States Patent [19]

Elward

[11] 3,970,999
[45] July 20, 1976

[54] MEMORY EXPANSION APPARATUS
[75] Inventor: John S. Elward, San Jose, Calif.
[73] Assignee: Hewlett-Packard Company, Palo Alto, Calif.
[22] Filed: Mar. 24, 1975
[21] Appl. No.: 561,470

[52] U.S. Cl. .......................................... 340/172.5
[51] Int. Cl.² .......................................... G06F 9/20
[58] Field of Search ............................... 340/172.5

[56] References Cited
UNITED STATES PATENTS
3,533,075   10/1970   Johnson et al. .................. 340/172.5

Primary Examiner—Raulfe B. Zache
Attorney, Agent, or Firm—David A. Boone; F. D. LaRiviere

[57] ABSTRACT

This invention addresses large memories in a computer through the use of translation tables, associated control circuitry, and an appropriate set of instructions. A portion of the memory address bits from the processor are used to address registers in translation tables. The output of the selected translation table register is appended to the remaining memory address bits (those not used to address the translation table) to form the expanded memory address. Data may be loaded into or read from the memory area selected by one translation table by a program being executed in a memory area selected by another translation table. Also, a user may execute a subroutine in a memory area selected by one translation table and then return to his main program in a memory area selected by another translation table. Memory is seen by the computer as a set of logical pages. Each translation table has a register corresponding to each logical page, starting with the lowest logical page which is called the base page. A fence register is used to partition the logical base page addresses of memory to provide a common area of physical memory accessible by every user. The logical addresses of the base page which address the common area of physical memory are transferred from the computer directly to memory regardless of the translation table base page register contents. Addresses other than those addressing the common area of physical memory are translated through the translation tables. Protection of any memory page from being loaded into or read from is provided through the use of protection bits in the translation tables registers.

11 Claims, 21 Drawing Figures

Figure 2

| 6D | 6C |
|---|---|
| 6A | 6B |

Figure 6

| 9D | 9C |
|----|----|
| 9A | 9B |

Figure 9

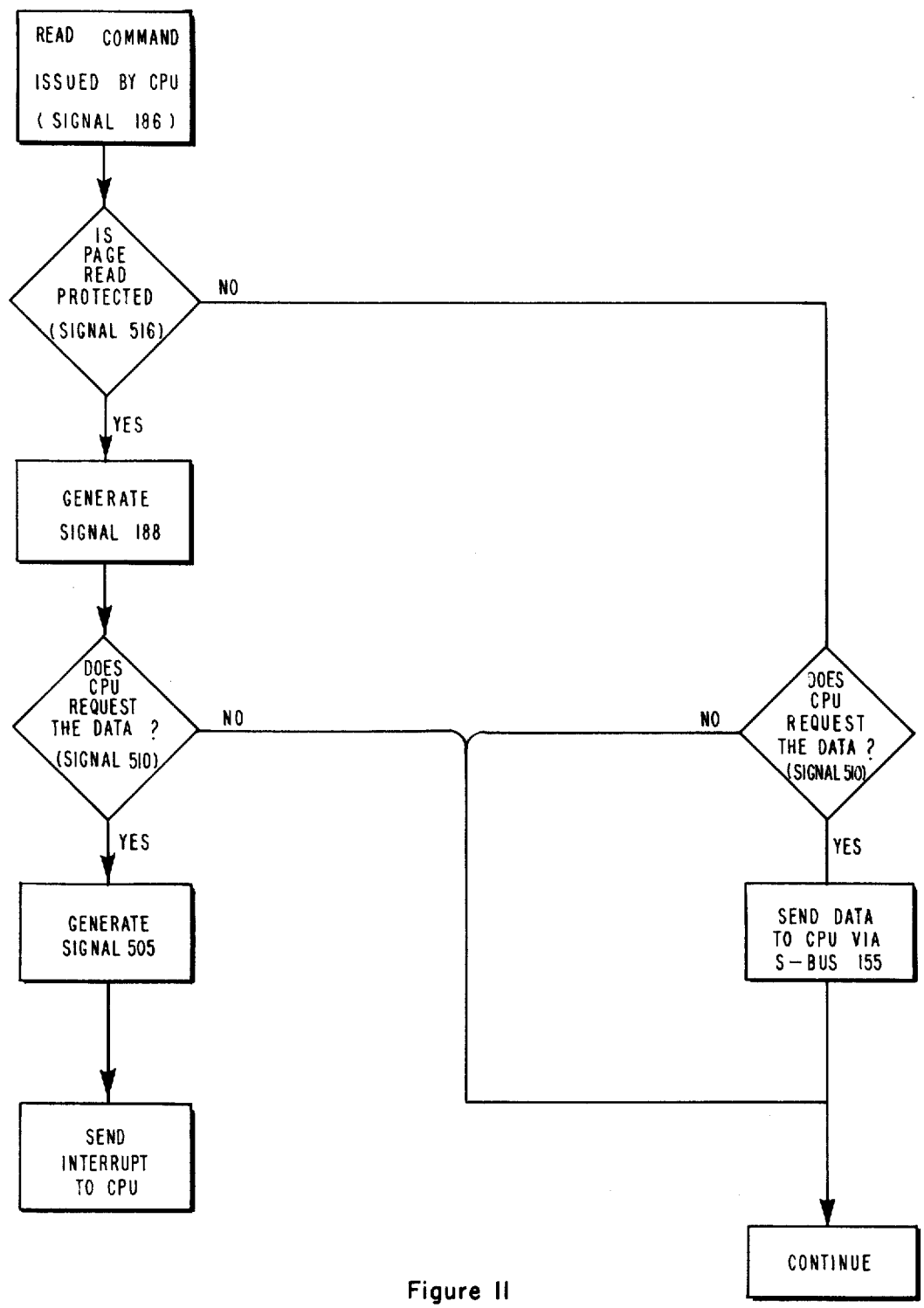
Figure II

MEMORY EXPANSION APPARATUS

BACKGROUND OF THE INVENTION

Applications of minicomputers have grown in sophistication and complexity to the point where their requirements for memory addressing capability have far exceeded the number of bits available in the computer's word length. This word length is typically 16 bits which limits the main memory of the computer to 32,768 words with infinite indirect addressing or 65,536 words if only one level of indirect addressing is allowed.

Because core memory technology had not provided economically attractive methods to provide large memory storage within a computer, past efforts were directed at mass memory devices such as magnetic discs or magnetic tape units. These mass memory devices could supply millions of bits for a small fraction of the cost of an equivalent core memory storage area. However, these devices are slow. Sometimes complex software operating systems were employed to make these devices appear to the user as an extension of the main computer memory. This technique, referred to as virtual memory, was slow and difficult to use efficiently.

Another obvious option available to the designer was to expand the word length of the computer and rearrange the architecture of the machine so that a longer word length was available for memory addressing. This was the most direct solution but also the most costly. For example, the registers, buses and the memory word length in a computer might have been expanded from 16 bits to 20 bits to increase the memory addressing capability from a maximum 65,536 to over 1,000,000 words. This option was especially unattractive when it was desirable to maintain software compatibility with previous computers because of the time and money that had been invested in building an extensive software library.

Another option that was available to the designer was bank switching. One apparatus for bank switching is described in patent application Ser. No. 360,286, entitled "Polymorphic Memory Apparatus and Method", filed by Robert J. Frankenberg on May 14, 1973. Bank switching was a cumbersome technique because of the requirement of an additional memory controller for each bank used in the system.

Also available to the designer was the use of translation tables. Prior art designs using translation tables lacked the versatility required for viable and sophisticated software operating systems. In a translation table system it is desirable to transfer words between memory areas selected by different translation tables, to execute subroutines in a memory area addressed by another translation table and to transfer program control to a program in a memory area addressed by another translation table. Furthermore, it is desirable to make some physical memory locations accessible to all users while allowing each user to also have a portion of physical memory reserved for his exclusive use.

SUMMARY OF THE INVENTION

In the preferred embodiment of the present invention, memory addresses from the central processing unit (CPU) are composed of a logical page address and a word address. The logical page address is used to address registers in a translation table containing physical page addresses. Physical page addresses differ from the logical page addresses in that physical page addresses contain more bits and address a specific area in physical memory. The physical page address is appended to the word address to form the complete physical memory address of a physical memory location that will be loaded into or read from by the computer. Any logical page may be translated to any physical page by loading the appropriate information into the translation table registers. Furthermore, since multiple translation tables are provided, the ultimate physical address selected will also depend on the particular translation table enabled.

Translation Table Enabling circuitry provides the capability of selectively altering the state of the translation tables while remembering their previous state. This circuitry is useful in executing instructions which allow a memory user to load into and read from memory location addressed through other translation tables. Other instructions permit permanent transfer of program control from a program in a memory area addressed by a first translation table to a program addressed by a second translation table. This is accomplished by disabling the first translation table, enabling the second translation table, and transferring program control to a specified address in physical memory through the second translation table. Other instructions provide for temporary transfer of program control from a main program in a memory area selected by a first translation table to a subroutine in a memory area selected by a second translation table by disabling the first and enabling the second translation table. The return to the main program is accomplished by reenabling the first translation table and disabling the second translation table upon completion of the subroutine.

The present invention also provides a register referred to as the fence register for storing a logical base page word address. Whenever the logical page addressed is the base page, the contents of this register are compared to the word address from the CPU. Based on the results of this comparison, the logical base page is translated to a physical page contained in the translation tables, or the address from the CPU is used to directly address a physical memory location. By directly addressing physical memory with the address from the CPU when indicated by the results of the comparison, a common area in physical memory is provided which is independent of any translation table base page register contents.

DESCRIPTION OF THE DRAWINGS

FIG. 6, 6A–6D is a schematic diagram of logic circuits of the preferred embodiment.

FIG. 9, 9A-9D is a logic diagram constructed according to a portion of the preferred embodiment.

FIG. 11 is a flowchart showing the logical steps for detecting a read violation in the preferred embodiment.

DESCRIPTION OF THE PREFERRED EMBODIMENT

Figure 1:
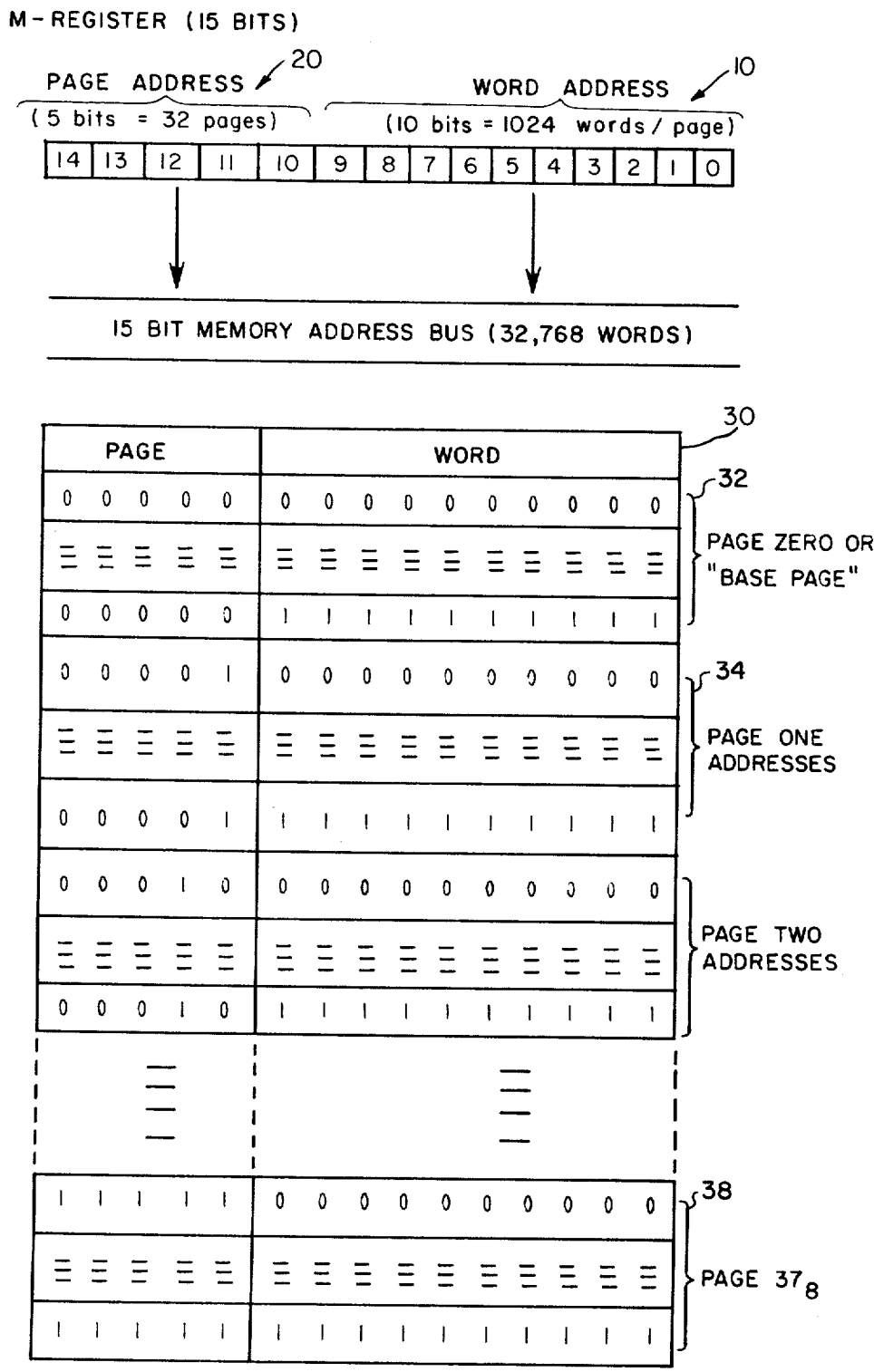
FIG. 1 shows the memory address format of a minicomputer for use with the preferred embodiment.

FIG. 1 shows the memory addressing scheme of a minicomputer wherein the memory address is divided into a page address 20 and a work address 10. The size of the page and word addresses was arbitrarily decided at the definition stage of the instruction set for the computer and is not related to a physical partitioning of memory or to the scope of the invention.

Figure 2:
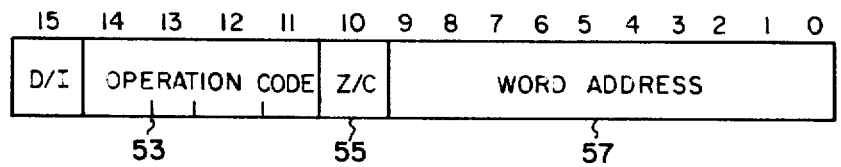
FIG. 2 shows the memory reference instruction format of a minicomputer.

Regardless of which page is selected, the word address will be between $0000_8$ ($0000_{10}$) and $1777_8$ ($1024_{10}$). As one increments the memory address the bits 0–9 will equal 0000 every $2000_8$ or $1024_{10}$ words which defines the page size for this embodiment. These page boundaries are shown by chart 30 in FIG. 1. The usefulness of the paging concept is shown by looking at the format of the memory reference instructions in FIG. 2. The operation code 53 specifies the operation to be performed on the word read from memory. Typical operations are ADD, AND, or XOR the contents of a memory location with the contents of a register. The word address 57 of the data to be read from memory is specified by bits 0–9 of the instruction. The page address of the word to be read from memory is determined by bit 55 and will be either the current page, defined as the page the instruction is on, or the zero page. Therefore, to presently available CPU's using page address schemes, the zero page addresses are extremely important because they are directly accessible by the CPU from anywhere in memory. Because of this restriction to directly address only the current page and zero page locations, minicomputer programmers have devised various programming schemes and segmented their programs to minimize this limitation. Adapting to these limitations, the present invention makes more pages of physical memory available to be selected while leaving the immediately addressable memory space at the previous 32 logical pages. The memory user has the option to change the contents of the translation table registers or use another translation table to address the memory area not addressed by the presently enabled translation table.

Figure 3:
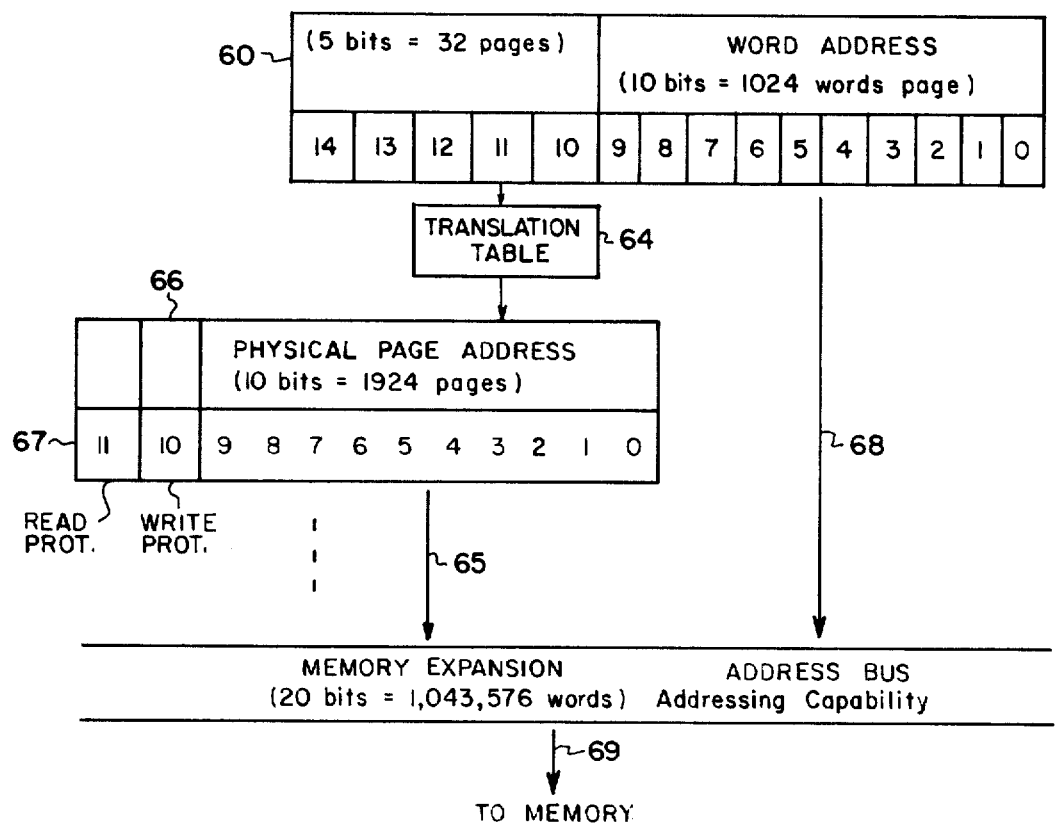
FIG. 3 is a diagram showing the address translation feature of the preferred embodiment.

Referring to FIG. 3, logical page address 60 specified by the computer is used to address one of the 32 registers in translation table 64 which provides a 12-bit word containing 10-bit physical page address 65 and bits 66 and 67. Bits 66 and 67 indicate whether the page is to be read-or write-protected when the memory protection circuitry is enabled. The 10-bit physical page address 65 is appended to the 10-bit word address 57 to form 20-bit address 69.

Figure 4:
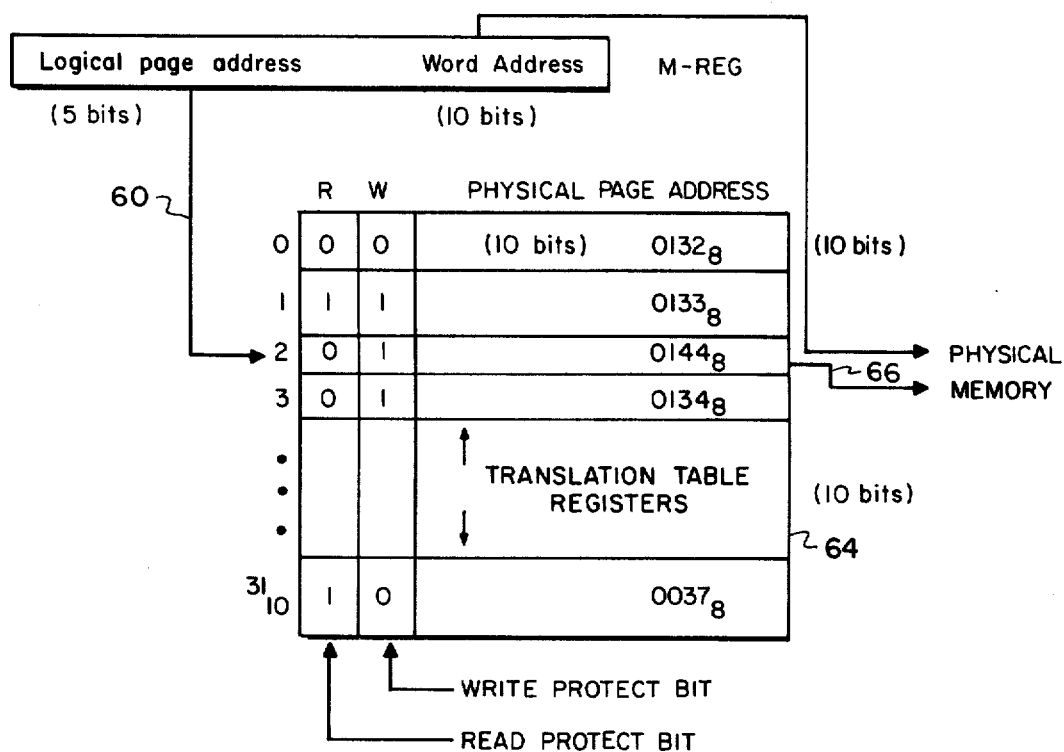
FIG. 4 is a diagram which describes the address translation provided by the preferred embodiment.

FIG. 4 also shows the operation of the translation table. The 5 bits of logical page address 60 address one of the 32 registers in translation table 64; the output of addressed register 64 is 10-bit physical page address 66. Even though there are $1024_{10}$ pages of memory selectable when using 10 bits for page addressing, only $32_{10}$ pages are selected by a single translation table at any one time because page addressing is still limited by the 5 bits of logical page address 60 from the CPU of the preferred embodiment.

Figure 5:
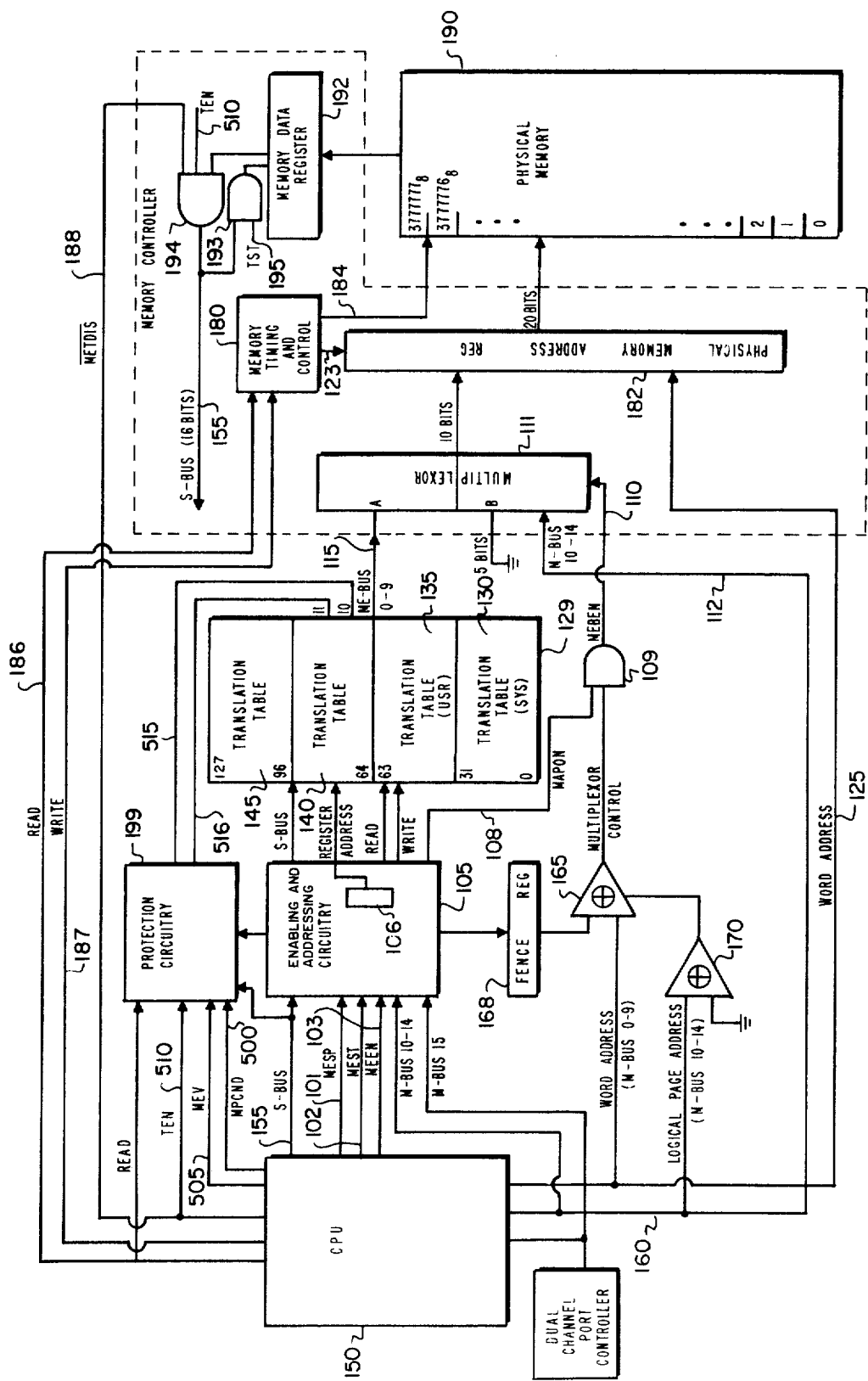
FIG. 5 is a block diagram constructed according to the preferred embodiment.

Referring to the block diagram of FIG. 5, the system is first described after initial power up. The state of 4 major control signals disables the memory expansion system, and all CPU to memory communication is carried on as if the preferred embodiment of the present invention is not installed. (For a description of the CPU and general memory operation refer to patent application Ser. No. 360,286 entitled "Polymorphic Memory Apparatus and Method", filed by Robert J. Frankenberg on on May 14, 1974. CPU 150 is also described in the HP Journal issue of October, 1974.

Signals 101, 102, and 103, are used together to command the system into one of the 8 states referred to as Q0 through Q7, which are described in Table 1. At the time of initial power up signals 101, 102, and 103 88 are all in the logical one state which is Q7 in Table I and represents the NOP, i.e., no operation, state of the system. These three signals cause enabling and addressing circuitry 105 to ignore all inputs and to maintain signal 108 in the logical zero state. (Signal 108 is preset to the logical zero state when power is first applied.) Therefore, multiplexer control gate 109 is disabled. Multiplexer control gate 109 generates signal 110 in the logical zero state which selects the B input of multiplexer 111 to be gated to physical memory address register 182. CPU 150 may only access the lowest 32K of physical memory when the B input of multiplexer 111 is selected since the 5 most significant bits of the B input of multiplexer 111 are grounded.

Still referring to FIG. 5, the translation table registers are addressed consecutively starting with 0 for the first register in translation table 130 and ending with $127_{10}$ for the last register in translation table 145. The translation table registers are loaded with address information as described below. First, the address of the register to be loaded is sent by CPU 150 via s-bus 155 to table address register 106 within enabling and addressing circuitry 105. It is clocked into table address register 106 by the simultaneous execution of system state command Q5 as described in Table I. (Special configurations of data on S-bus 155 and their effect in conjunction with the execution of the state commands of Table I is shown in Table II.) Next, the physical page address and write/read protection information is placed on s-bus 155, lines 0–9, 14 and 15 respectively, and stored into the selected translation table register by the simultaneous execution of stage command Q1, as described in Tables I and II. The above procedure is repeated until all translation table registers are loaded with the desired information. Special instructions which streamline operation of the system are described in Appendix A.

Figure 6:
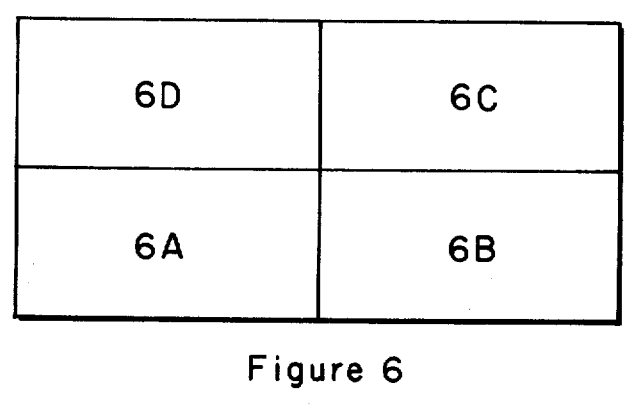
Figure 6A:
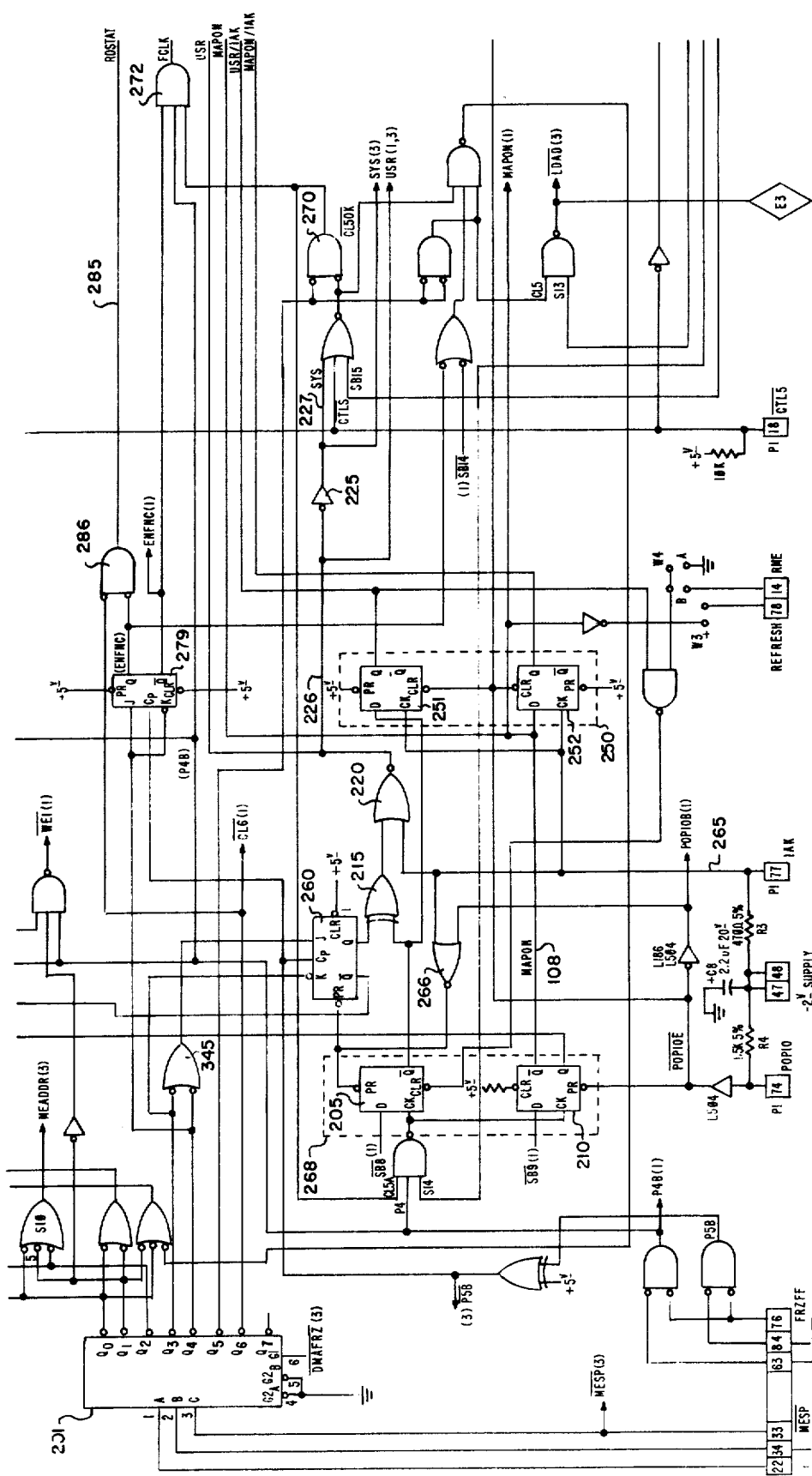

Referring to FIG. 6A, it is necessary to transmit a control word to state register 268 and execute state command Q5 to begin logical page address translation by the preferred embodiment. This is accomplished by simultaneously presenting a control word on s-bus 155, the logic state of the bits selected per Table II, and executing system state command Q5, described in Table I. For instance, to begin translation of logical page addresses from the computer through translation table 130, the s-bus control word must have all bits in the logical zero state except s-bus 14. The decoding of system state command Q5 by state command decoder 201 causes flip-flop (FF) 205 to be set and FF 210 to be reset. The $\overline{Q}$ output of FF 205 is coupled to gate 215, producing a logic one output therefrom. The logic one output from gate 215 produces a zero output from gate 220. The output of gate 220 is coupled to inverter 225 to produce signal 227 in the logic one state. Signals 227 and 226 are the enable signals for translation tables 130 and 135 respectively. FF 210 is reset and generates signal 108 in the one logic state. Therefore, logical page address translation through translation table 130 is enabled.

Referring now to FIG. 5, logical page address 160 from CPU 150 is gated to translation table 130. The contents of the translation table register addressed by logical page address 160 is output to bus 115 and is coupled to the A input of multiplexer 111. The signal 108 is in the logical one state, and since the output from comparator 165, usage discussed below, is a logic one state at this time, gate 109 produces signal 110 in the logical one state. Multiplexer 111 selects the A input, the translation table register contents on bus 115, to be output to the 10th through 19th bits of physical memory address register 182. The word address 125 is coupled to the 0 through 9th bits of physical memory address register 182.

Still referring to FIG. 5, when a read command 186 or a write command 187 is output from CPU 150 to memory timing and control 180, the clock signal on line 123 will clock both the output from multiplexer 111 and word address 125 into physical memory address register 182. Also, timing and control signals 184 are output to physical memory 190. Execution of read command 186 reads the data from physical memory 190 into memory data register 192. Transfer of data from memory data register 192 to CPU 150 will be discussed below with protection circuitry 199. Execution of write command 187 is preceded by storing the word to be written in memory in memory data register 192.

Assuming that all the translation table registers are loaded with the desired physical page addresses, CPU 150 may now access memory locations through any one of the translation tables or may disable the translation tables by executing system state command Q5, described in Table I, and use logical page address 160 with word address 125 to directly access the lowest 32 pages of physical memory.

Referring to FIG. 6A, circuitry of the preferred embodiment is shown which saves the enabled state of the translation table in use upon receipt of any CPU interrupt. This circuitry then selects the translation table addressing the memory area containing the program to service the interrupt. Subsequently, the translation table that was in use at the time of the interrupt may be restored to the enabled state. The contents of state register 268 are stored in save register 250 in response to signal 265 for use in subsequently restoring those contents in state register 268. Also, translation table 130 is enabled through gate 266. Signal 265 is also coupled to gate 220, which provides a logical zero to gate 225, thereby generating signal 227 and selecting translation table 130. Circuitry in CPU 150 responds to signal 265 and causes the next instruction to be fetched from the memory location address having the same binary value as the select code of the device interrupting. FF 205 is coupled to gate 215 which supplies a low logic level output to gate 200. Gate 220 will now continue to provide a low output after signal 265 goes to the logical zero state. FF 260 is also set by signal 265.

After an interrupt has been processed by the CPU, the interrupt program will then restore the original state register contents. The save register 250 is read onto s-bus 155 by executing system state command Q6, described in Table I. The state command decoder 201 provides signal Q6 to gate 286, which causes signal 285 to read the contents of save register 250 onto lines 15 and 14 of s-bus 155. (FF 279 is assumed set at this time. FF 279 is used when it is desired to read the violation register, described later, instead of the status register. This is accomplished by executing state command Q4 immediately prior to the execution of state command Q6, thereby setting FF 279 which then disables gate 286 and enables gate 272 instead.) CPU 150 then shifts the bits read from save register 250 so they are positioned on lines 9 & 8 of s-bus 155. The CPU then merges these shifted bits with a data word having a logical one at bit 14 and then reads them back onto s-bus 155 while again executing system state command Q5, described in Table I. The information on s-bus bits 8 and 9 is clocked into state register 268, and the original state of the translation tables is thereby restored. Only two translation tables are controlled by the circuit of FIG. 6, but any number of translation tables could be controlled in this way by adding additional storage elements to both state register 268 and save register 250.

Another circuit shown in FIG. 6 is particularly suited to applications where it is desirable to alternately enable two different translation tables for the transferring of blocks of data from a memory area selected by one translation table to a memory area selected by another translation table or to execute subroutines in a memory area selected by another translation table. Some elements of this circuit have been extracted from FIG. 6 and are shown in FIG. 7. Once FF 205 is set, signal 227 will be output in the logical one state from gate 225. Translation table 130 is enabled and translation table 135 is disabled. To alternately enable translation table 130 and translation table 135 it is necessary to execute system state command Q3 as described in Table I. Operation of this circuit is described below.

Figure 8:
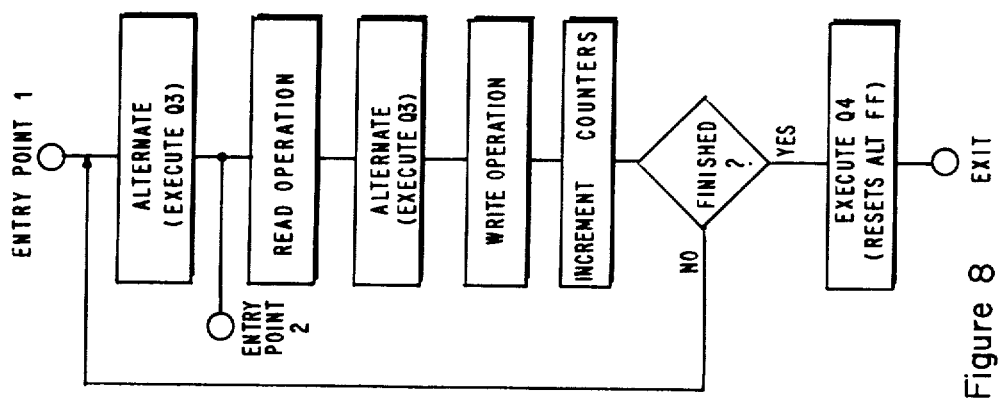
FIG. 8 contains a flow chart of the operation of transferring data between memory areas accessed through different translation tables according to the preferred embodiment.

Still referring to FIG. 7, assuming that FF 260 is reset and FF 205 is reset, gate 220 has a logical zero output, and gate 225 has a logical one output. Therefore, translation table 130 is enabled. Execution of system state command Q3 places a logical one level from the output of gate 345 on the J input and a logical zero level on the inverting K input of FF 260. Clock signal 346 will cause FF 260 to toggle to the set state. This produces a low output from gate 215, thereby disabling translation table 130 through gate 225 and enabling translation table 135. Memory is subsequently accessed through translation table 135. Execution of system state command Q3 again will restore translation table 130 to the enabled state and disable translation table 135. The usefulness of this circuitry is shown by the flowchart in FIG. 8.

The flow chart procedure can be implemented in a software program, a microprogram, or hardware circuitry. The preferred embodiment uses a microprogram because of the speed of its execution. (All microprograms of the system instructions are listed in Appendix C. Definitions of the microinstructions are found in Appendix B.) There are two entry points. Assume for a moment that translation table 130 is enabled and a program in memory area 335 is being executed. If it is desired to read from memory are 335 through translation table 130 and write into memory area 340 through translation table 135 then entry point 2 is used. If entry point 1 is used words will be read from memory area 340 and written into memory area 335.

The above descriptions have been described in terms of accessing data in a memory area address by another translation table. However, these circuits are also effective in the execution of subroutines in memory areas addressed by other translation tables. Particular instructions are listed in Appendix A.

Referring to FIG. 5, the method by which word addresses of the logical base page are selected either for translation through the translation table, if it is enabled, or for direct addressing of physical memory will now be described. Before system operation is begun, fence register 168 is loaded by executing system state command Q5, described in Table I, while reading data, in the format described in Table II, onto s-bus 155. Thereafter, when the system is enabled and logical page address 160 addresses the base page, comparator 165 outputs an enable signal to comparator 165. Comparator 165 then compares word address 125 to the contents of fence register 168. If the word address 125 is within the logical base page area selected to directly address physical memory, the output signal from comparator 165 will be a logical zero level. This will disable gate 109 and the B input of multiplexer 111 is gated to the physical memory address register 182. If the comparison of logical work address 125 with the contents of fence register 168 does not indicate the word address is to directly address physical memory, then gate 109 will not be disabled and the translation table register contents on ME-bus 115 will be gated from the A input of the multiplexer 111 to physical memory address register 182.

Therefore, the base page word addresses selected for direct addressing provide a common area of physical memory which is accessed by every memory use regardless of the translation table register contents. The remaining word addresses on the logical base page are translated by the translation table registers and may be assigned to access any area of physical memory 190 by storing various physical page addresses in the registers of translation tables 130, 135, 140, and 145 which are addressed when logical page address 160 addresses the base page. The address chosen as the dividing point between the dedicated and common areas is chosen by the system programmer.

The protection circuitry 199 shown in FIG. 5 does not check for write violations until CPU 150 provides signal MPCND 500 in the logical one state. Any instructions which attempts a write or jump operation has a microinstruction step where it executes MPCK (described below in Appendix B) and reads the suspect address onto s-bus 155. When a protected memory area is being addressed, execution of the microinstruction MPCK by CPU 150 provides signal 500 to protection circuitry 199. Detected attempts to violate a protected area of memory will result in the generation of signal 505 to CPU 150 which will inhibit the instruction.

Figure 9:
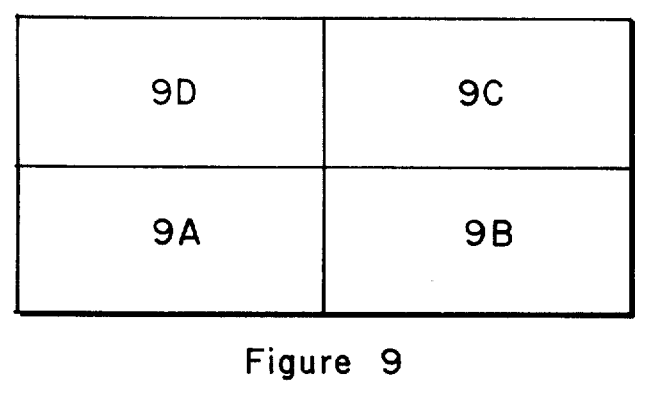
Figure 9A:
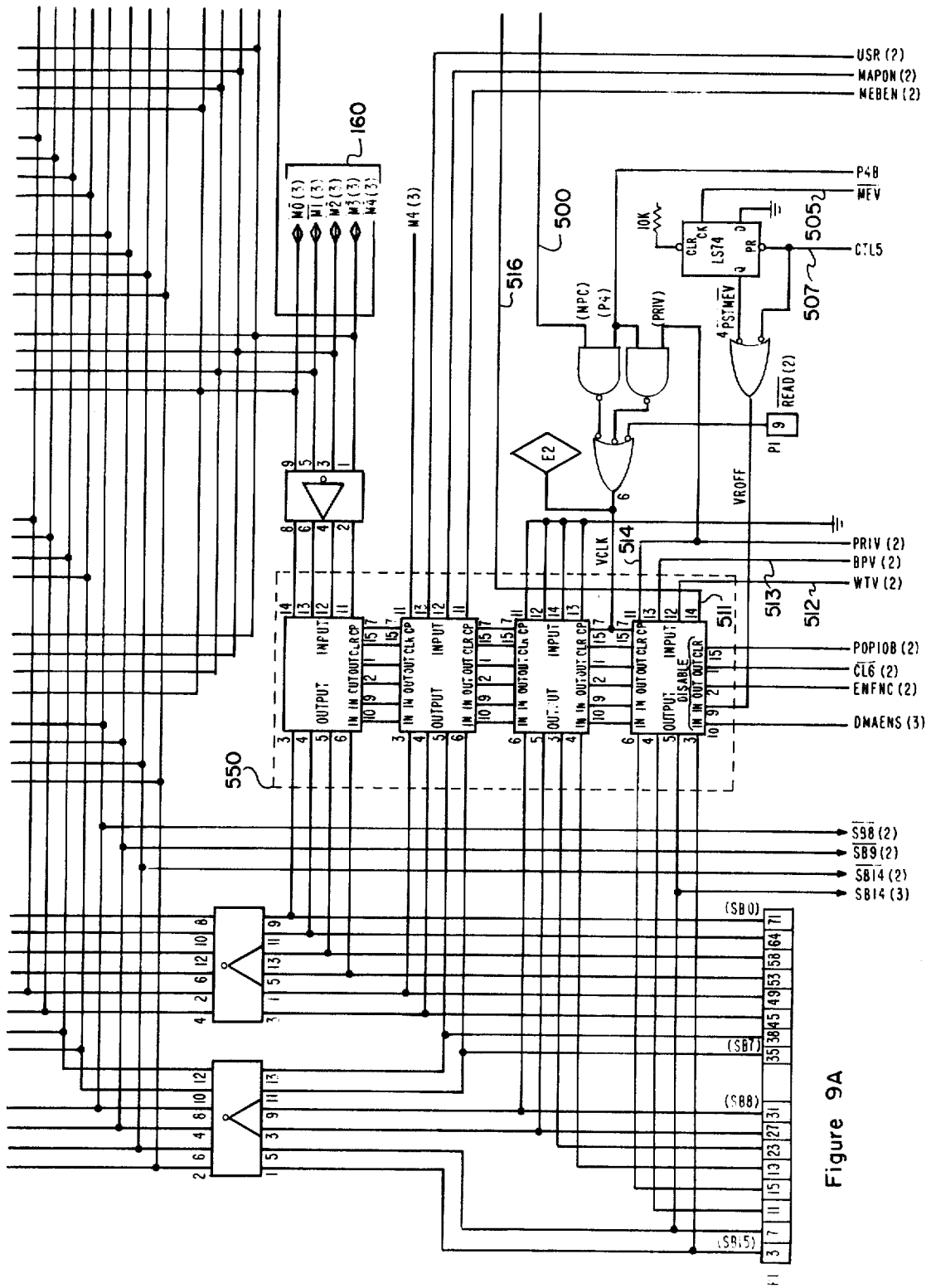
Figure 9B:
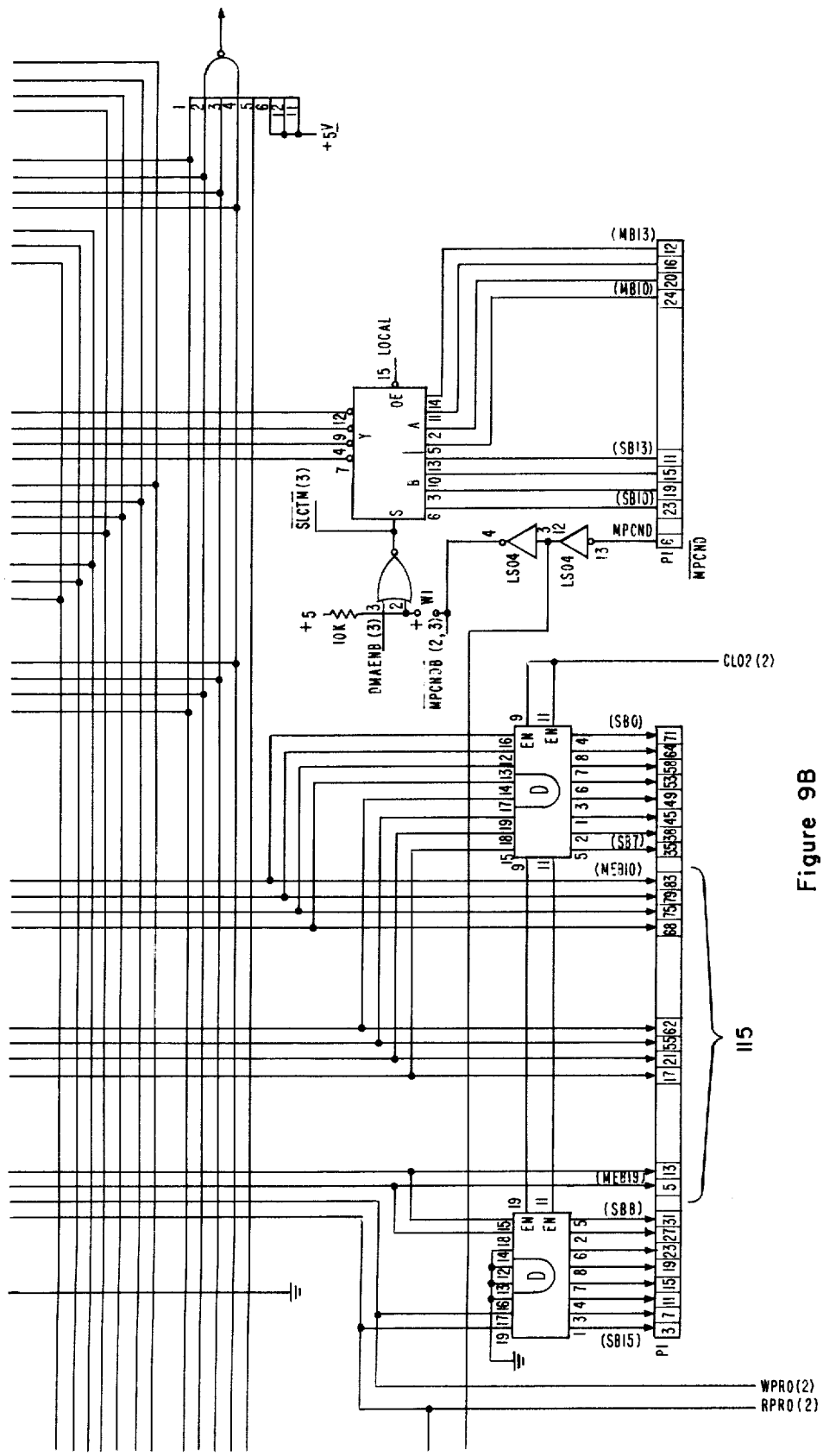
Figure 9C:
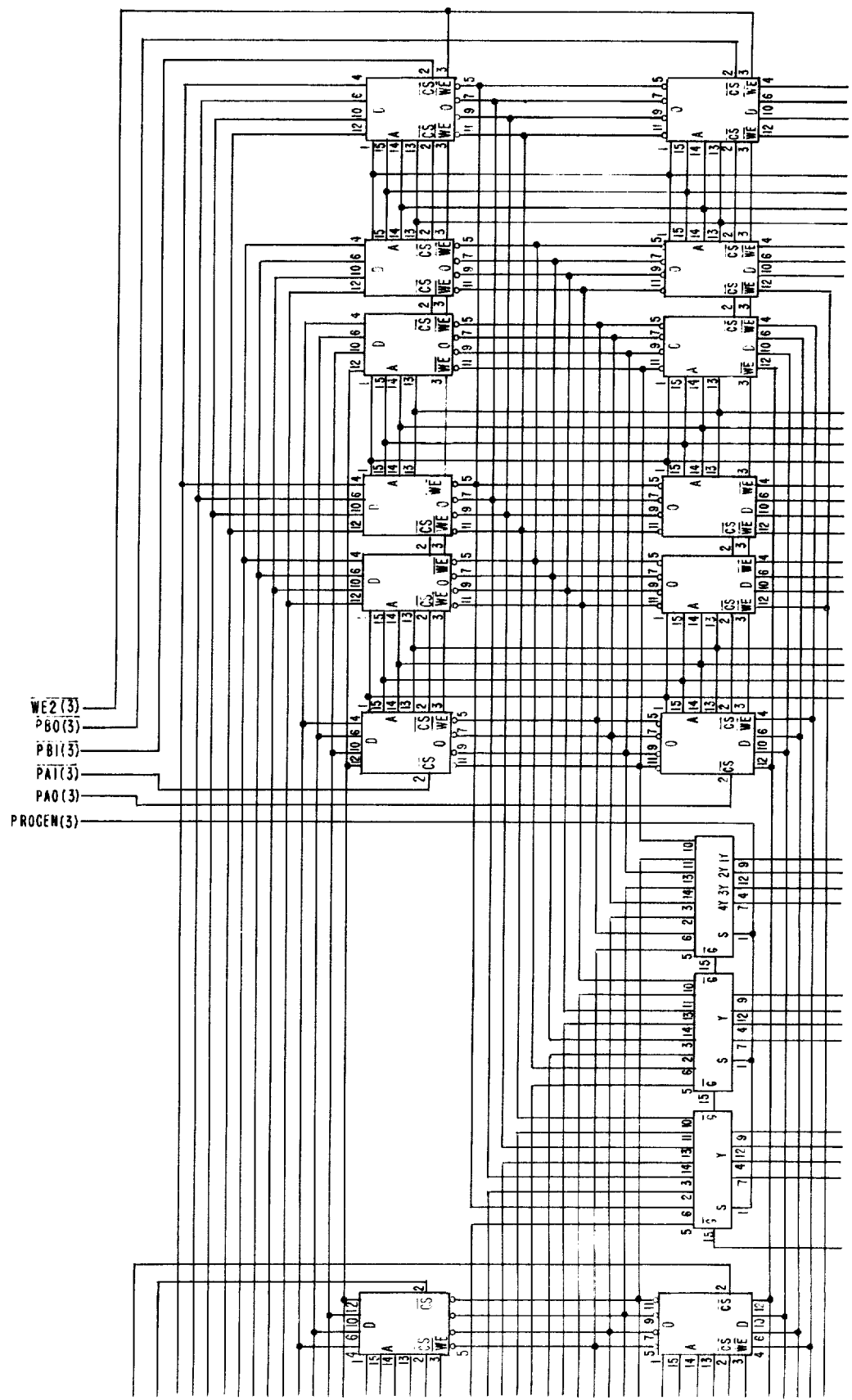
Figure 9D:
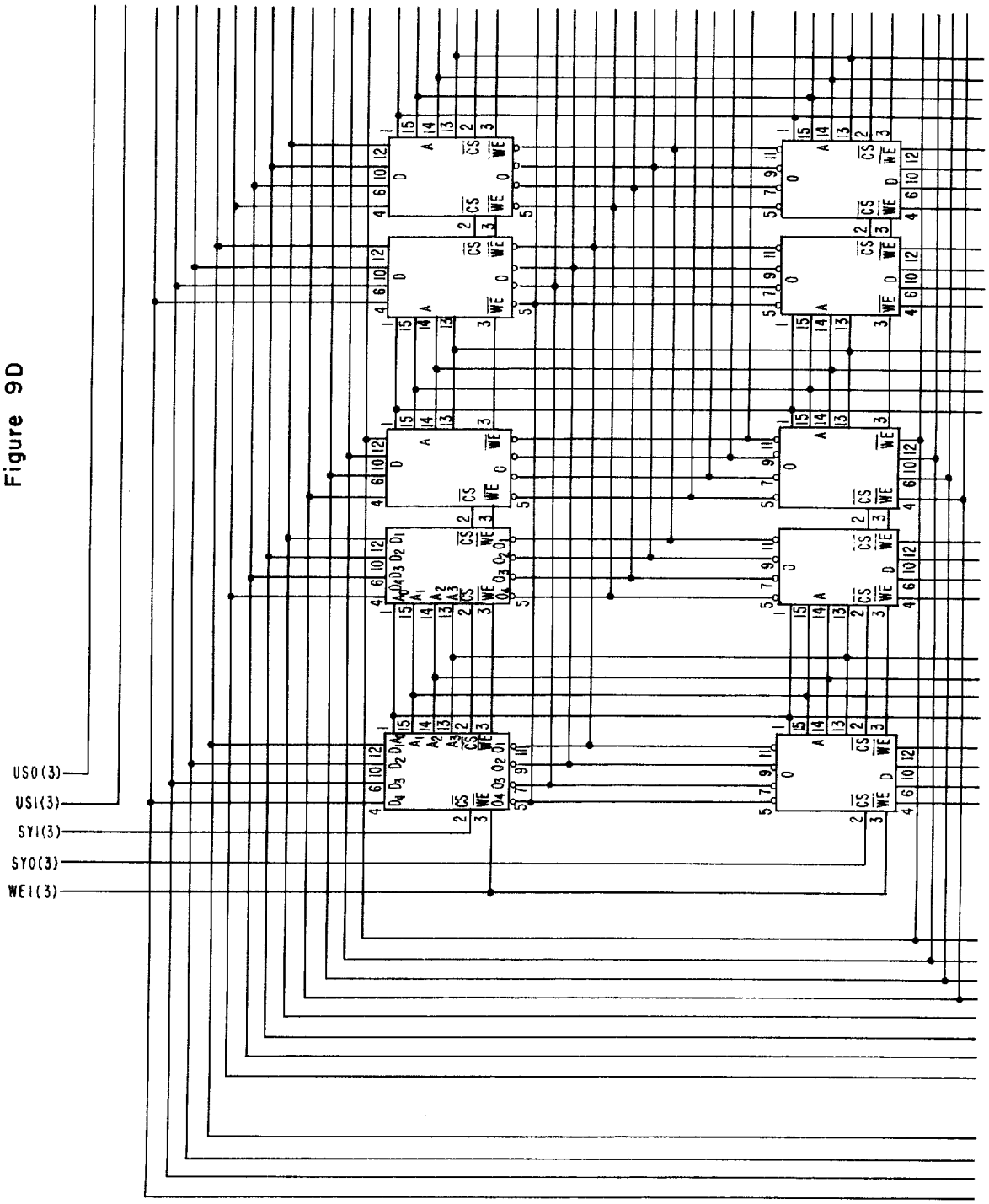
Figure 10:
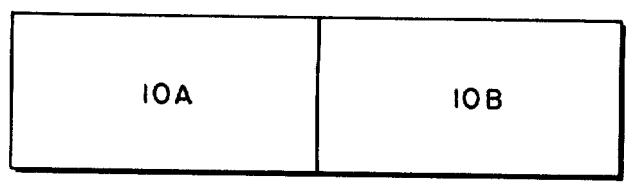
FIG. 10, 10A-10B is a logic diagram construction according to a portion of the preferred embodiment.
Figure 10A:
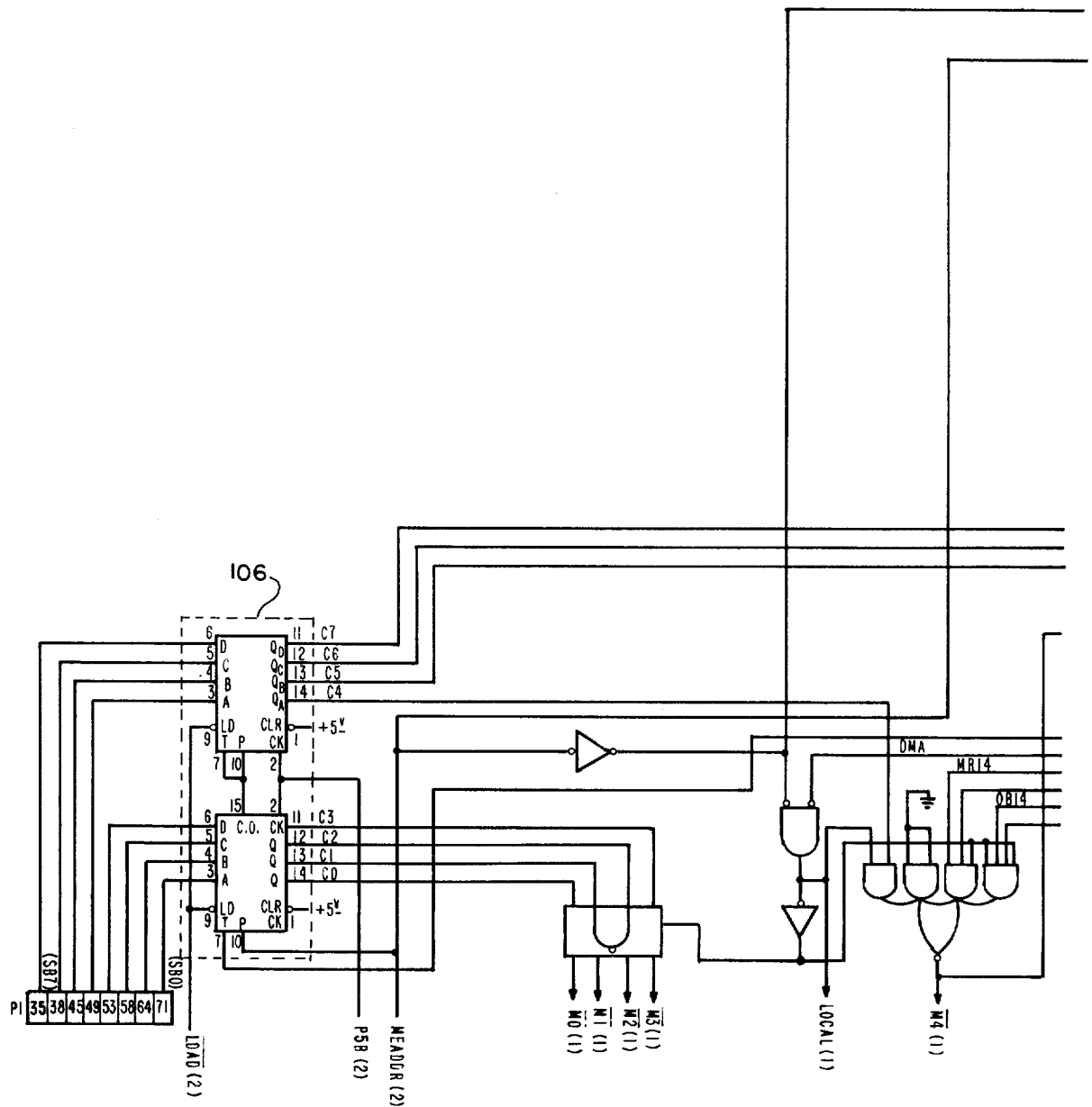
Figure 10B:
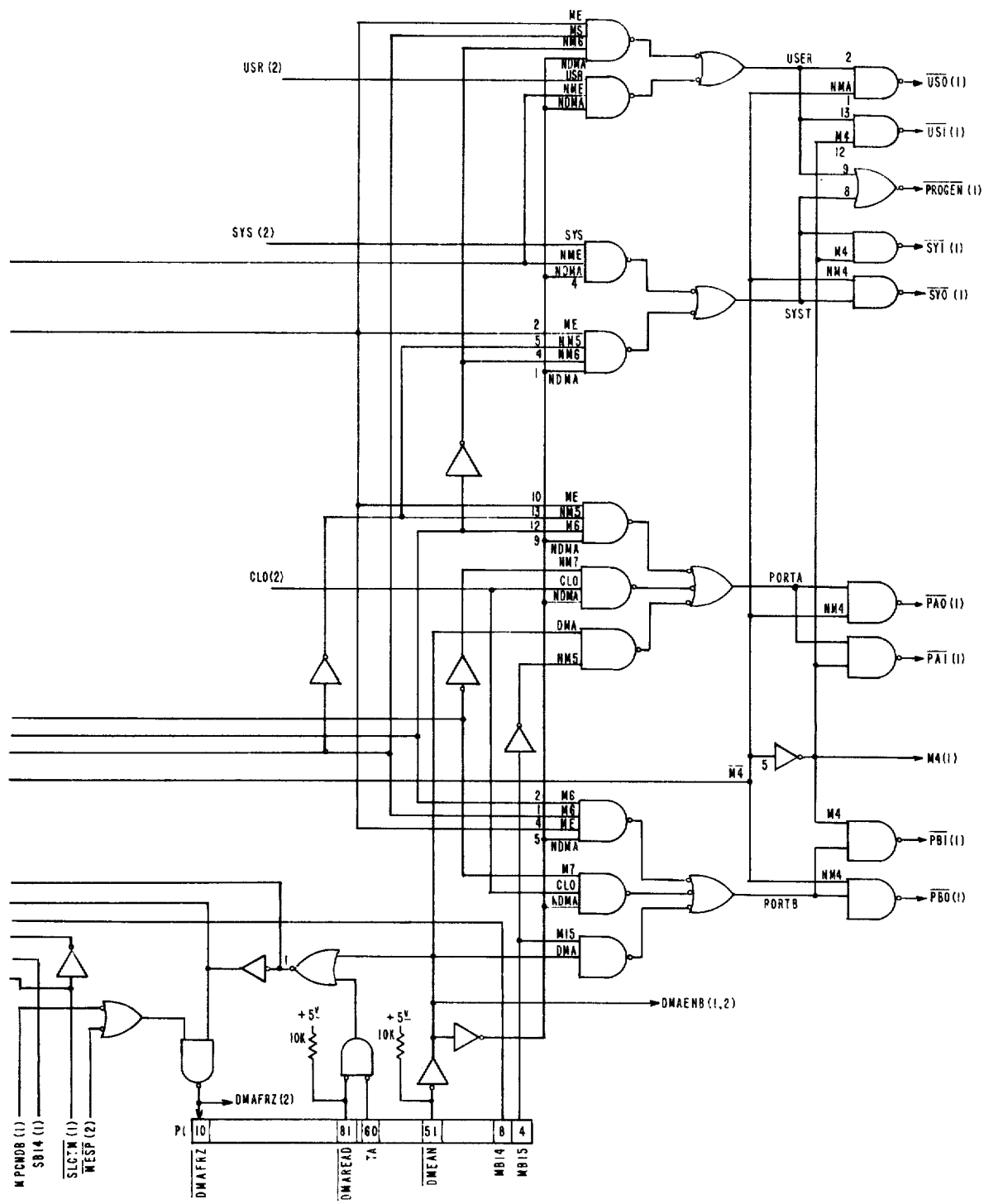

Referring to FIG. 9A, violation register 550 stores logical page address 160 and the type of violation that has occurred. The violation register clock is generated by signal 500, signal 514, or signal 186, depending on the type of violation. Once a violation has occurred, the generation of signal 505 sets flip-flop 506 which prevents the violation register from being altered until reset by CPU 150.

The four classes of violations are read-protect violation, write-protect violation, base page violation, and priviledged instruction interrupt and are discussed more fully in the instruction descriptions in Appendix A. These violations are indicated by signals 511, 512, 513 and 514, respectively. The state of these signals is saved in violation register 550 when the violation is detected. The format of the word saved in the violation register is shown in Table III.

The work "map" is synonomous with translation table and is used in the tables, program listing comments, and the instruction descriptions. The work mapped indicates the logical page address has been translated to a physical page address by the translation tables.

Figure 6B:
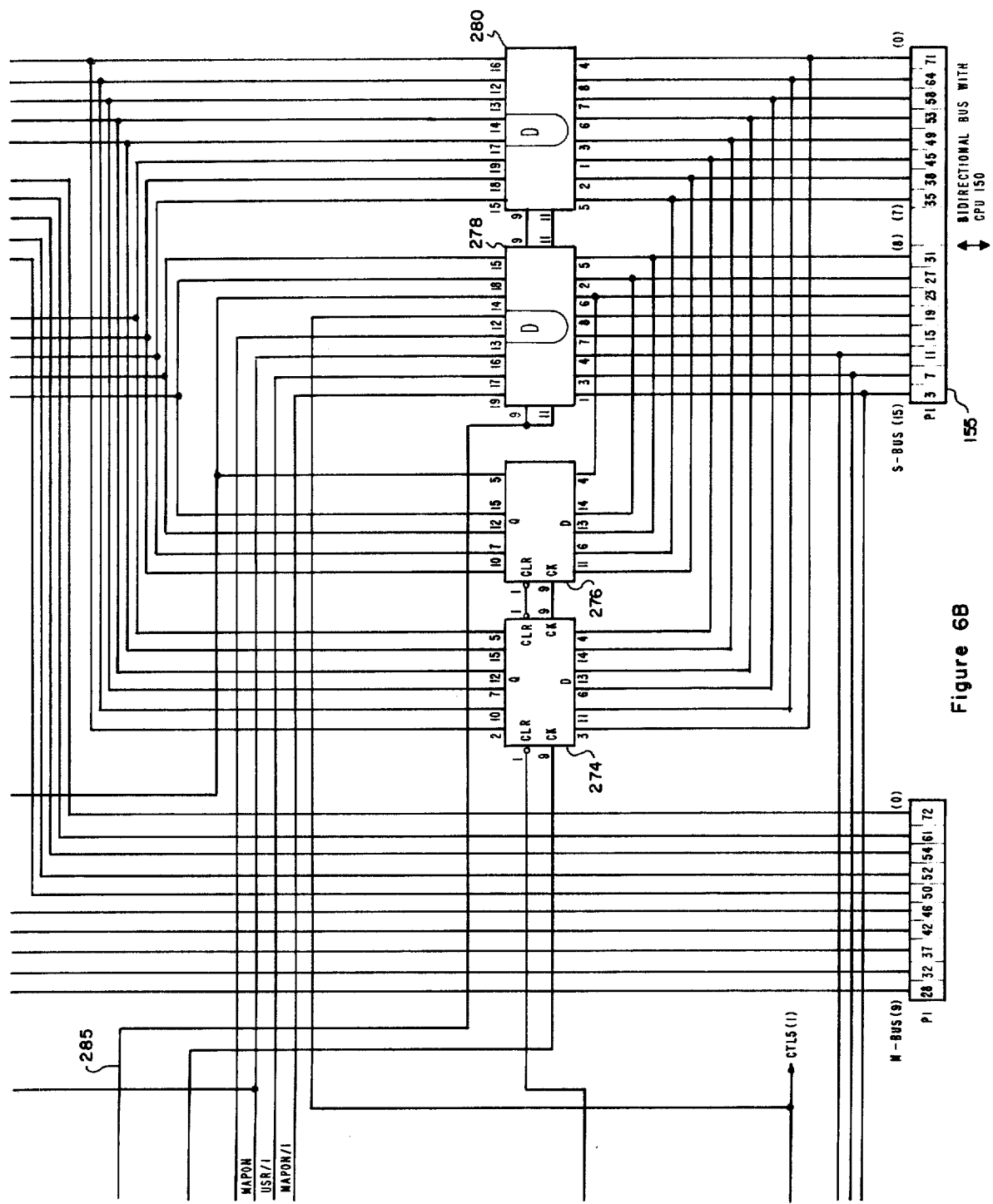
Figure 6C:
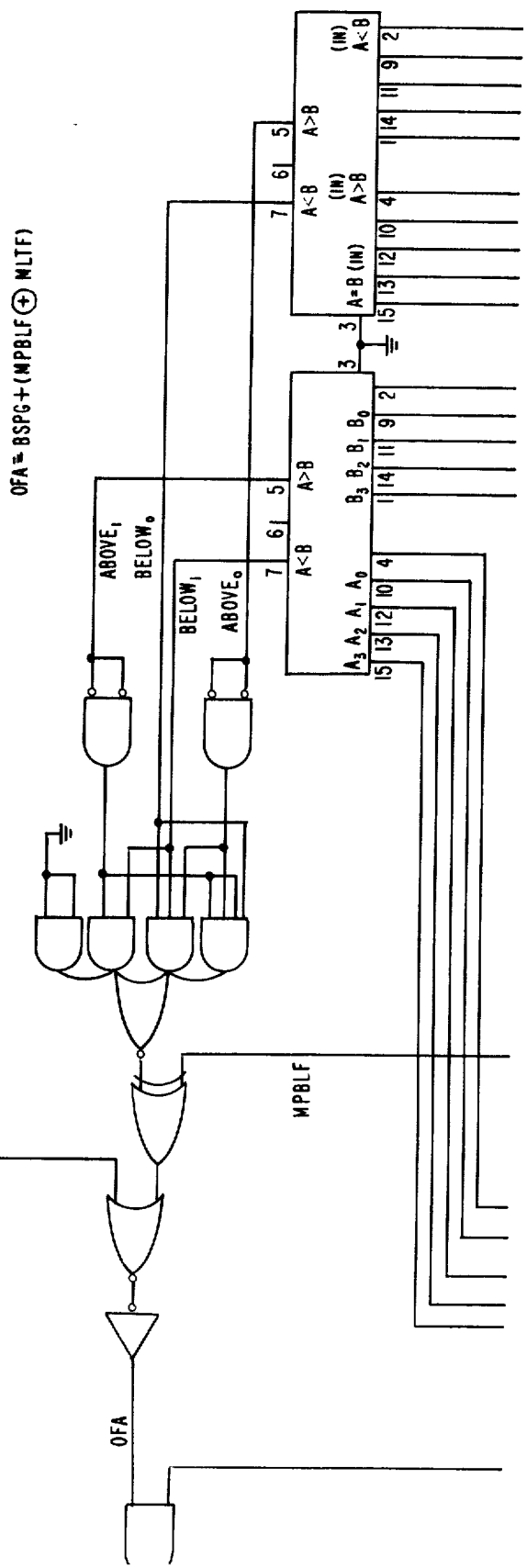
Figure 7:
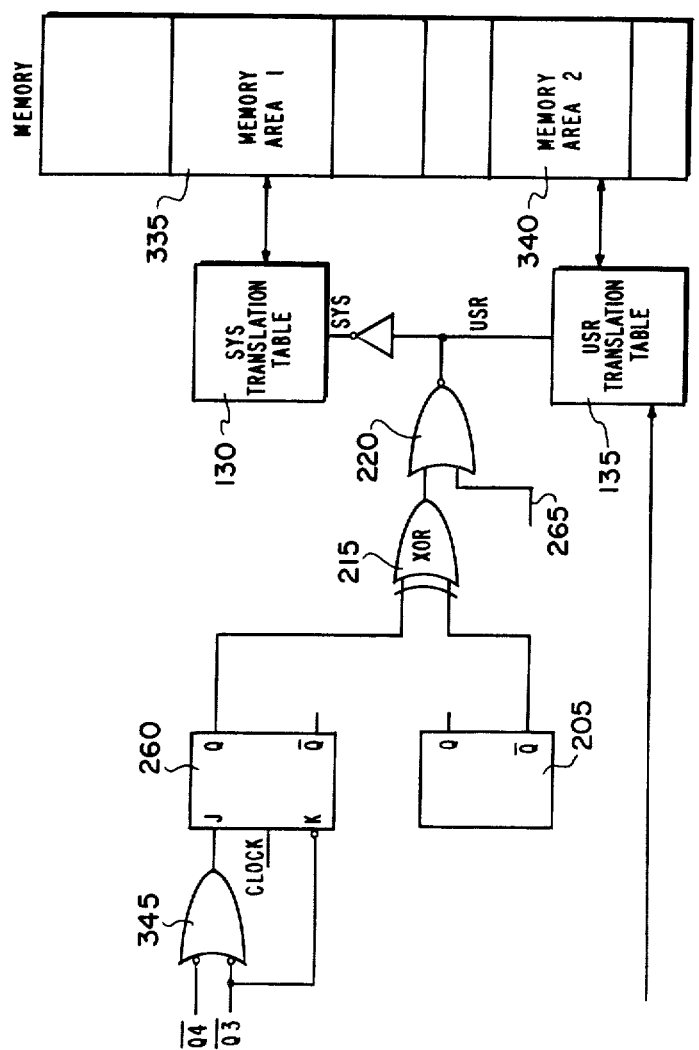
FIG. 7 is a simplified diagram of circuits useful for transferring data between memory areas accessed by different translation tables.

Further information regarding the state of the system is available to CPU 150 from status register 279, shown in FIG. 6B. It provides status information in the format shown in Table III in response to system state command Q6. Signal 285 enables gates 278 and 280 to read status information onto s-bus 155. Referring to FIG. 6A, the state command decoder 201 output is coupled to gate 286 which provides signal 285 only if FF 279 has been reset by the execution of system state command Q4, described in Table I.

Figure 6D:
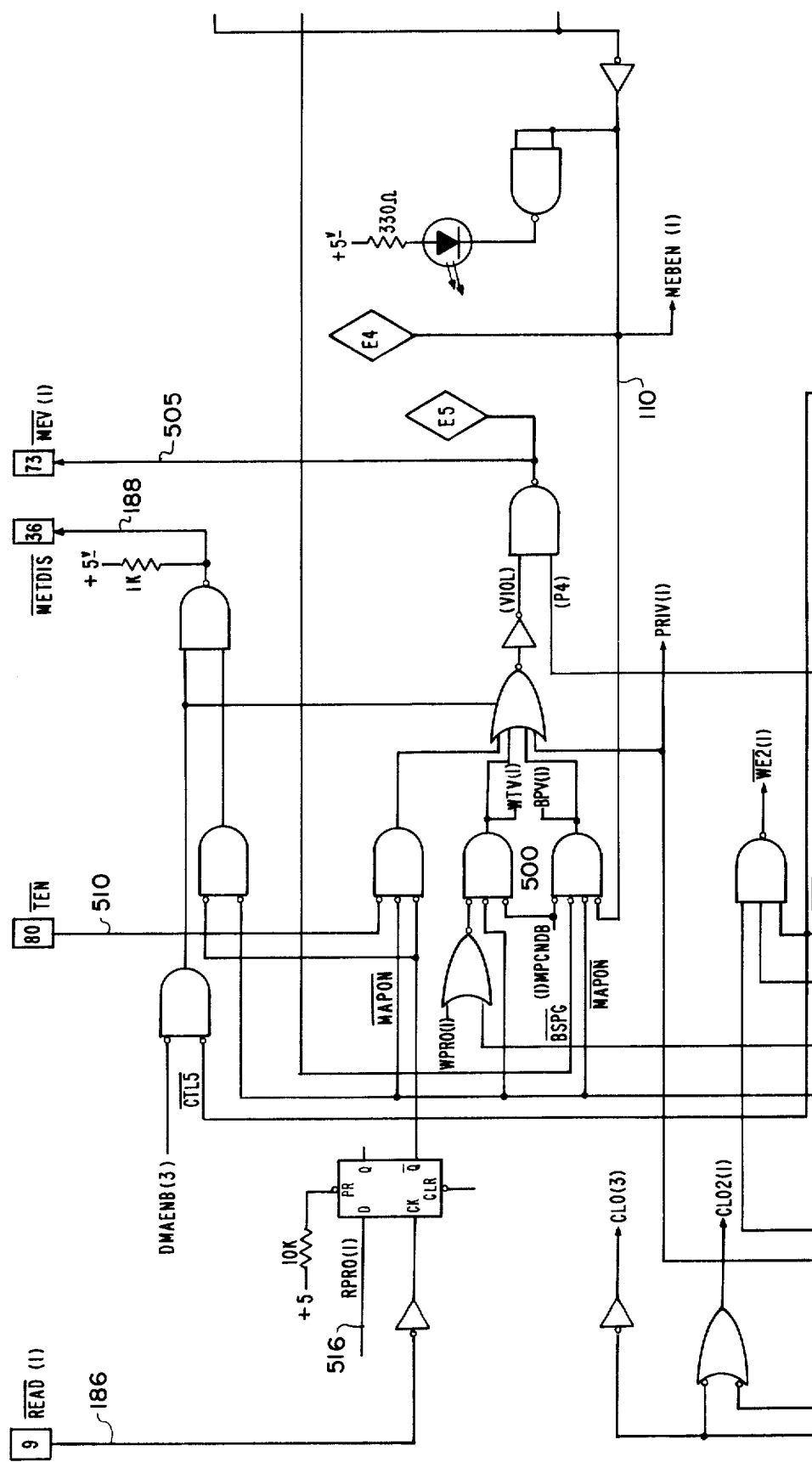

All attempted violations of protected memory or attempts to execute prohibited instructions are detected and inhibited at the time the instruction is begun except for the read protect feature. Modern CPU architectures use look ahead read circuitry to read the memory location most likely to be requested next before a read command is issued. Therefore, the violation circuitry does not generate an interrupt until CPU 150 actually requests data. Referring to FIG. 5, this is indicated by the generation of signal 510 by CPU 150 to memory data register 192 via gate 194. When this request for data occurs and read protection is indicated by read protect bit 516 protection circuit 199 will generate signal METDIS 188 in the logical zero state. This inhibits reading the contents of the protected memory location back to CPU 150 via s-bus 155. The detailed diagram of this portion of the protection logic is shown in FIG. 6D. FIG. 11 is a flow chart which shows the logical steps performed by the circuitry to determine whether a read violation is being attempted.

TABLE I

| COMMAND | SYSTEM STATE COMMANDS SYSTEM USAGE |
|---|---|
| $Q_0$ | [1] Enable reading of SYS/USR map to S-bus (per register 106, Bit 5)<br>[2] Store S-bus into maps (per register 106, Bit 7)<br>[3] Relative map address specified by register 106, Bits (0–4) |
| $Q_1$ | [1] Store S-bus into maps (per register 106, Bits 5,6)<br>[2] Map register address specified by register 106, Bits (0–4) |

TABLE I-continued

| COMMAND | SYSTEM STATE COMMANDS SYSTEM USAGE |
|---|---|
| $Q_2$ | $^1$ Enable maps to S-bus (per register 106, Bits 5,6)<br>$^2$ S-bus bits (10–13) are always low<br>$^3$ Map register, address specified by register 106, Bits (0–4) |
| $Q_3$ | $^1$ Select opposite program map |
| $Q_4$ | $^1$ Set "Status Command" Flag through next microprocessor cycle (See Q6)<br>$^2$ Reset to currently selected program map |
| $Q_5$ | $^1$ Store S-bus into;<br>   a) MEM State Register (2-bits)<br>   b) MEM Fence Register (11-bits)<br>   c) MEM Address Register (8-bits)<br>$^2$ Above registers selected by S-bus bits (15–13) |
| $Q_6$ | $^1$ Enable status data onto S-bus;<br>   a) Normally reads Violation Register<br>   b) If preceded by $Q_4$ command, Status Register will be Read. |
| $Q_7$ | $^1$ No microcode specified<br>$^2$ NOP state |

TABLE II

| STATE COMMAND | S-BUS BITS | SIGNIFICANCE OF S-BUS BITS |
|---|---|---|
| $Q_0$ | 0–9 | S-bus bits 0–9 represent address data being stored into a selected map register. |
|  | 14 | S-bus bit 14 represents the Write Protect bit. |
|  | 15 | S-bus bit 15 reresents the Read Protect bit. |
| $Q_1$ |  | S-bus bits 0–9 represent data being stored into a selected map register. |
|  |  | S-bus 14 represents the Write Protect bit. |
|  |  | S-bus 15 represents the Read Protect bit. |
| $Q_2$ | 0–9,14,15 | S-bus bits represent data being read from the selected Map register. |
|  | 10–13 | Always in zero state. |
| $Q_3$ | N/A | No special significance. |
| $Q_4$ | N/A | No special significance. |
| $Q_5$ | 15 | Allow privileged operation. |
|  | 14 | Load State Register 268 per S-bus bits 8,9 |
|  | 13 | Load Register 106, per S-bus bits 0–10 |
| $Q_6$ | 0–15 | Status register, per Table III or violation register, per Table IV |
| $Q_7$ | N/A | No special significance. |

TABLE III

| Bit | STATUS REGISTER Significance |
|---|---|
| 15 | MEM Off/On (0/1) at least interrupt |
| 14 | System/User (0/1) selected at last interrupt |
| 13 | MEM Off/On (0/1) currently |
| 12 | System/User (0/1) selected currently |
| 11 | PM enabled currently |
| 10 | Portion mapped* |
| 9 | Base Page Fence Bit 9 |
| 8 | Base Page Fence Bit 8 |
| 7 | Base Page Fence Bit 7 |
| 6 | Base Page Fence Bit 6 |
| 5 | Base Page Fence Bit 5 |
| 4 | Base Page Fence Bit 4 |
| 3 | Base Page Fence Bit 3 |
| 2 | Base Page Fence Bit 2 |
| 1 | Base Page Fence Bit 1 |
| 0 | Base Page Fence Bit 0 |

*Bit 10 Mapped Addresses
    0 Fence ≤ M<2000$_8$
    1 1<M<Fence

TABLE IV

| Bit | VIOLATION REGISTER Significance |
|---|---|
| 15 | Read Violation |
| 14 | Write Violation |
| 13 | Base Page Violation |
| 12 | Privileged Instruction Violation |
| 11 | Reserved |
| 10 | Reserved |
| 9 | Reserved |
| 8 | Reserved |
| 7 | ME-Bus enabled |
| 6 | MEM maps enabled |
| 5 | System/User (0/1) enabled |
| 4 | Map register bit 4 |
| 3 | Map register bit 3 |
| 2 | Map register bit 2 |
| 1 | Map register bit 1 |
| 0 | Map register bit 0 |

APPENDIX A

Special terms and special notes plus abbreviations useful in interpreting the instruction descriptions. "MEM" refers to the system of the preferred embodiment.

Protected Mode (PM)
    A program state created by the CPU.
    Protected mode is entered by executing an STC 05B instruction.
    Protected mode is exited by the CPU acknowledging an interrupt.
    Preset will disable mapping functions and exit the protected mode.

MEM Violation (MEMV)
    Any of several conditions met which are not allowed by the preferred embodiment.
    Can only occur when in PM.
    Signified by an interrupt request to Channel 5 with the I/O Flag set (i.e., one may programmatically detect whether CPU or MEM caused the interrupt by execution of either a SFS 05 or SFC 05).
    N.B. a STF 05 or CLF 05 still enables or disables the parity-related functions of MP.

MEM Violation Register (MVR)
    The MVR is not loaded with any data until Control-5 is set.
    It is then continuously strobed until a MEMV occurs or Control-5 is cleared.
    Therefore the contents are valid following a MEMV until STC 05 is issued. Preset will clear the MVR.

Base Page Fence (BPF)

Allows a portion of the base page (00000-01777) to reference the corresponding physical address regardless of which map is enabled.

Whether the portion is above or below the fence address is program assignable when the fence is set.

Logical addresses 00000 and 00001 (i.e. A/B) are not mapped when using the standard set of assembly language instructions.

Preset will clear the BPF.

Power Fail/Auto Restart

All registers on the MEM are volatile and should be saved in main memory by the power fail routines if auto-restart is desired.

Upon restoration of power, all maps are disabled and must be loaded before enabling under program control.

The MVR and BPF are automatically cleared when power is restored.

Alternate Map

The MEM has four distinct maps.

Two are for program execution.

The program map which has been specifically enabled is referred to as the current map.

The other program map is referred to as the "alternate map".

The Port A and Port B maps are never referred to as current or alternate. These are used by other devices to communicate with memory.

For example: SJP would make the System map be the current map and the User map would then be the alternate map.

MEM MACRO INSTRUCTIONS

| CODE* | MNEMONIC | LEN | PRV | INT | DESCRIPTION |
|-------|----------|-----|-----|-----|-------------|
| 02 | MBI | 1 | A | Y | Move Bytes Into |
| 03 | MBF | 1 | M | Y | Move Bytes From |
| 04 | MBW | 1 | A | Y | Move Bytes Within |
| 05 | MWI | 1 | A | Y | Move Words Into |
| 06 | MWF | 1 | M | Y | Move Words From |
| 07 | MWW | 1 | A | Y | Move Words Within |
| 10 | SYA/B | 1 | M | N | Load/Store System |
| 11 | USA/B | 1 | M | N | Load/Store User |
| 12 | PAA/B | 1 | M | N | Load/Store Port A |
| 13 | PBA/B | 1 | M | N | Load/Store Port B |
| 14 | SSM | 2 | M | N | Store Status in Memory |
| 15 | JRS | 3 | M | N | Jump and Restore Status |
| 20 | XMM | 1 | M | Y | Transfer Map or Memory |
| 21 | XMS | 1 | M | Y | Transfer Map Sequentially |
| 22 | XMA/B | 1 | A | N | Transfer Maps Internally |
| 24 | XLA/B | 2 | M | N | Cross Load |
| 25 | XSA/B | 2 | A | N | Cross Store |
| 26 | XCA/B | 2 | M | N | Cross Compare |
| 27 | LFA/B | 1 | A | N | Load Fence |
| 30 | RSA/B | 1 | N | N | Read Status |
| 31 | RVA/B | 1 | N | N | Read Violation |
| 32 | DJP | 2 | M | N | Disable and JMP |
| 33 | DJS | 2 | M | N | Disable and JSB |
| 34 | SJP | 2 | M | N | Enable System AND JMP |
| 35 | SJS | 2 | M | N | Enable System and JSB |
| 36 | UJP | 2 | M | N | Enable User and JMP |
| 37 | UJS | 2 | M | N | Enable User and JSB |

*Last two octal digits. Preceded by 1017 or 1057 as required for A/B register significance. Instructions not explicitly referencing A/B will receive 1057 from the Assembler.

The column headings are defined as follows:

LEN - number of words to this macro.

PRV - special consideration is given this instruction when executed under protected mode (i.e. Control-5 is set). If "A" (always) then this instruction itself is illegal under PM and will always cause an MEM Violation. If M (maybe) then the particular instruction can cause a MEMV as explained in the instruction description information. If N (never) then this instruction will never generate a MEMV in any mode.

INT - Indicates whether the execution routine of the instruction is interruptible or not.

Disable MEM and JUMP

Mnemonic: DJP
Octal code: 105732
Format:    DJP
           DEF    ADR(,I)

Causes translation and protection features of MEM to be disabled. The P-register is then set to the address resolved from ADR(,I) prior to disabling. As a result of executing this instruction, normal I/O interrupts are held off until the first opportunity following the fetch of the next instruction, unless three or more levels of indirect are used. If no maps are enabled, the instruction defaults to a JMP *+1,I.

This instruction will normally generate a MEMV when executed in PM. However, if the System map is enabled, it is allowed in PM.

Disable MEM and Jump to Subroutine

Mnemonic: DJS
Octal Code: 105733
Format:    DJS
           DEF    ADR(,I)

Causes translation and protection features of MEME to be disabled. The P-register is then set one past the address resolved from ADR (,I) prior to disabling. The return address is written into ADR(,I). As a result of executing this instruction, normal I/O interrupts are held off until the first opportunity following the fetch of the next instruction, unless three or more levels of indirect are used.

This instruction will normally generate a MEMV when executed in PM. However, if the System map is enabled, it is allowed in PM.

Jump and Restore Status

Mnemonic: JRS
Octal Code: 105715
Format:    JRS
           DEF    STS(,I)
           DEF    ADR(,I)

Causes status of MEM (i.e., enable/disable and System/User) to be restored as indicated by Bits 15, 14 of STS(,I). Bits (13-0) are ignored. The P-register is set to ADR(I,). As a result of executing this instruction, normal I/O interrupts are held off until the first opportunity following the fetch of the next instruction, unless three or more levels of indirect are used.

This instruction will normally generate a MEMV when executed in PM. However, if the system map is enabled it is allowed in PM.

Load Fence from A/B-register

Mnemonic: LFA, LFB
Octal Code: 101727, 105727
Format: LFA

Loads the Base Page Fence Register from the A-register or B-register. Bits (9-0) specify the address in page zero where shared (unmapped) memory is separated from reserved (mapped) memory. Bit 10 is used to specify which portion is mapped.

| Bit 10 | Mapped Addresses (M) |
|---|---|
| 0 | Fence ≤ M < 2000₈ |
| 1 | 1 < M < Fence |

This instruction will normally generate a MEMV when executed in PM. However, if the system map is enabled, it is allowed in PM. When a MEMV does occur, the fence is not altered.

Move Bytes From the Alternate Map

```
Mnemonic: MBF
Octal Code: 105703
Format:  LDA   SRC
         LDB   DST
         LDX   CNT
         MBF
```

Moves a string of bytes using the alternate program map for source reads and the currently enabled map for destination writes. The A-register contains the source byte address. The B-register contains the destination byte address. The X-register contains the number of bytes to be moved. Both the source and destination must begin on word boundaries. The instruction is interruptible on an even number of byte transfers, thus maintaining the even word boundaries in A and B. At the time of interrupt, A, B, and X are reset to allow continuation of the instruction at next entry. When completed, the X-register will always be zero; A and B will be equal to the original address plus the number of bytes moved.

This instruction can cause a MEMV only if Read or Write protection rules are violated.

Move Bytes Into the Alternate Map

```
Mnemonic: MBI
Octal Code: 105702
Format:  LDA   SRC
         LDB   DST
         LDX   CNT
         MBT
```

Moves a string of bytes using the currently enabled map for source reads and the alternate program map for destination writes. The A-register contains the source byte address. The B-register contains the destination byte address. The X-reg contains the number of bytes to be moved. Both the source and destination must begin on word boundaries. The instruction is interruptible on an even number of byte transfers, thus maintaining the even word boundaries in A and B. At the time of interrupt, A, B, and X are reset to allow continuation of the instruction at next entry. When completed, the X-register will always be zero; A and B will be equal to the original address plus the number of bytes moved.

This instruction will cause a MEMV when executed in PM and no bytes will be transferred, if so indicated by the write protection bit.

Move Bytes Within the Alternate Map

```
Mnemonic: MBW
Octal Code: 105704
Format:  LDA   SRC
         LDB   DST
         LDX   CNT
         MBW
```

Moves a string of bytes with both the source and destination addresses established through the alternate program map. The A-register contains source byte address. The B-register contains the destination byte address. The X-register contains the number of bytes to be moved. Both the source and destination must begin on word boundaries. The instruction is interruptible on an even number of byte transfers, thus maintaining the even word boundaries in A and B. At the time of interrupt, A, B, and X are reset to allow continuation of the instruction at next entry. When completed, the X-register will always be zero; A and B will be equal to the original address plus the number of bytes moved.

This instruction will cause a MEMV when executed in PM and no bytes will be transferred, if so indicated by the write protection bit.

Move Words from the Alternate Map

```
Mnemonic: MWF
Octal Code: 105706
Format:  LDA   SRC
         LDB   DST
         LDX   CNT
         MWF
```

Moves a series of words using the alternate program map for source reads and the currently enabled map for destination writes. The A-register contains the source address. The B-register contains the destination address. The X-register contains the number of words to be moved. The instruction is interruptible after each word move, at which time A, B and X are reset to allow continuation at next entry. When completed the X-register will always be zero; A and B will be equal to the original address plus the number of words moved.

This instruction can cause a MEMV only if Read or Write protection rules are violated.

Move Words Into the Alternate Map

```
Mnemonic: MWI
Octal Code: 105705
Format:  LDA   SRC
         LDB   DST
         LDX   CNT
         MWT
```

Moves a series of words using the currently enabled map for source reads and the alternate program map for destination writes. The A-register contains the source address. The B-register contains the destination address. The X-register contains the number of words to be moved. The instruction is interruptible after each word move, at which time A, B and X are reset to allow continuation at next entry. When completed the X-register will always be zero; A and B will be equal to the original address plus the number of words moved.

This instruction will cause a MEMV when executed in PM and no words will be transferred, if so indicated by the write protection bit.

Move Words Within the Alternate Map

Mnemonic: MWW
Octal Code: 105707
Format:　LDA　　SRC
　　　　　LDB　　DST
　　　　　LDX　　CNT
　　　　　MWW Moves a series of words with both the source and destination addresses established through the alternate program map. The A-register contains the source address. The B-register contains the destination address. The X-register contains the number of words to be moved. The instruction is interruptible after each word move, at which time A, B and X are reset to allow continuation at next entry. When completed, the X-register will always be zero; A and B will be equal to the original address plus the number of words moved.

This instruction will cause a MEMV when executed in PM and no words will be transferred, if so indicated by the write protect bit.

Load/Store Port A Map per A/B

Mnemonic: PAA, PAB
Octal Code: 101712, 105712
Format:　LDA　　TBL
　　　　　PAA

Transfers 32 map registers to or from memory. If bit 15 of A/B is clear, the Port A map is loaded from memory starting from the address specified in bits 14-0 of A/B. If bit 15 of A/B is one, the Port A map is stored into memory starting at the address specified in A/B. The A/B register will be incremented by 32 to allow multiple map instructions. An attempt to load any map register in PM will cause a MEMV. An attempt to store the Port A map is allowed within the constraints of Write protected memory.

Load/Store Port B Map per A/B

Mnemonic: PBA, PBB
Octal Code: 101713, 105713
Format:　LDA　　TBL
　　　　　PBA

Transfer 32 map registers to or from memory. If bit 15 of A/B is clear, the Port B map is loaded from memory starting from the address specified in bits 14-0 of A/B. If bit 15 of A/B is set, the Port B map is stored into memory starting at the address specified in A/B. This A/B register will be incremented by 32 to allow multiple map instructions. An attempt to load any map register in PM will cause a MEMV. An attempt to store the Port B map is allowed within the constraints of Write protected memory.

Read Status Register into A/B-Register
Mnemonic: RSA, RSB
Octal Code: 101730, 105730
Format: RSA Transfers the 16-bit contents of the MEM status register into A/B. This instruction may be executed at any time. The status register format is listed in Table III.

Read Violation Register into A/B-Register
Mnemonic: RVA, RVB
Octal Code: 101731, 105731
Format: RVA Transfers the 16-bit contents of the MEM violation register into A/B. This instruction may be executed at any time. The violation register format is listed in Table IV.

Enable System Map and Jump

Mnemonic: SJP
Octal Code: 105734
Format:　SJD
　　　　　DEF　　ADR (,I)

Causes MEM hardware to use the set of 32 map registers, referred to as the System map, for translating all programmed memory references. The P-register is then set to the address resolved from ADR (,I) prior to enabling. As a result of executing this instruction, normal I/O interrupts are held off until the first opportunity following the fetch of the next instruction, unless three or more levels of indirect are used.

This instruction will normally generate a MEMV when executed in PM. However, if the System map is enabled it is allowed and effectively executes a JMP*+1,I.

Enable System Map and Jump to Subroutine

Mnemonic: SJS
Octal Code: 105735
Format:　SJS
　　　　　DEF　　ADR(,I)

Causes MEM hardware to use the set of 32 map registers, referred to as the System map, for translating all programmed memory references. The P-register is then set one past the address resolved from ADR(,I) prior to enabling. The return address is written into ADR(,I). As a result of executing this instruction, normal I/O interrupts are held off until the first opportunity following the fetch of the next instruction, unless three or more levels of indirect are used.

This instruction will normally generate a MEMV when executed in PM. However, if the System map is enabled it is allowed and effectively executes a JSB *+1,I.

Store Status Register in Memory

Mnemonic: SSM
Octal Code: 105714
Format:　SSM
　　　　　DEF　　STS(,I)

Stores the 16-bit contents of the MEM status register into the memory location pointed to by STS(,I). This instruction is used in conjunction with the JRS instruction to allow easy processing of interrupts which always enable the System map (if the MEM is enabled). The status register format is listed in Table III.

This instruction can cause a MEMV only if Write protection rules are violated.

Load/Store System Map per A/B

```
Mnemonic: SYA, SYB
Octal Code: 101710, 105710
Format:   LDA    TBL
          SYA
```

Transfers 32 map registers to or from memory. If bit 15 of A/B is clear, the System map is loaded from memory starting from the address specified in bits 14-φ of A/B. If bit 15 of A/B is set the System map is stored into memory starting at the address specified in A/B. The MEM provides no protection (if not in PM) against altering the contents of maps while they are currently enabled. The A/B register will be incremented by 32 to allow multiple map instructions.

An attempt to load any map in PM will cause a MEMV. An attempt to store the System map is allowed within the constraints of Write protected memory.

Enable User Map and Jump

```
Mnemonic: UJP
Octal Code: 105736
Format:   UJP
          DEF    ADR(,I)
```

Causes MEM hardware to use the set of 32 map registers, referred to as the User map, for translating all programmed memory references. The P-register is then set to the address resolved from ADR (I) prior to enabling. As a result of executing this instruction, normal I/O interrupts are held off until the first opportunity following the fetch of the next instruction, unless three or more levels of indirect are used. If the User Map is already enabled, the instruction defaults to a JMP *+1,I.

This instruction will normally generate a MEMV when executed in PM. However, if the System map is enabled, it is allowed in PM.

Enable User Map and Jump to Subroutine

```
Mnemonic: UJS
Octal Code: 105737
Format:   UJS
          DEF    ADR(,I)
```

Causes MEM hardware to use the set of 32 map registers, referred to as the User map, for translating all programmed memory references. The P-register is then set to one past the address resolved from ADR(,I) prior to enabling. The return address is written into ADR(,I). AS a result of executing this instruction, normal I/O interrupts are held off until the first opportunity following the fetch of the next instruction, unless three or more levels of indirect are used. If the User map is already enabled, the instruction defaults to a JSB *+1,I.

This instruction will normally generate a MEMV when executed in PM. However, if the System map is enabled, it is allowed in PM.

Load/Store User Map

```
Mnemonic: USA, USB
Octal Code: 101711, 105711
Format:   LDA    TBL
```

USA

Transfers 32 map registers to or from memory. If bit 15 of A/B is clear the User map is loaded from memory starting from the address specified in bits 14-0 of A/B. If bit 15 of A/B is set the User map is stored into memory starting at the address specified in A/B. The MEM provides no protection (if not in PM) against altering the contents of maps while they are currently enabled. The A/B register will be incremented by 32 to allow multiple map instructions.

An attempt to load any map in PM will cause a MEMV. An attempt to store the User map is allowed within the constraints of Write protected memory.

Cross Compare

```
Mnemonic: XCA,XCB
Octal Code: 101726, 105726
Format:   XCA
          DEF    ADR(,I)
```

Compares the contents of the A/B register to a second operand in memory. If they are equal the next instruction in numerical sequence is executed. If not equal, the next instruction is skipped. The second operand is obtained by resolving ADR(,I), and using the alternate program map for the read operation. If neither the System map nor the User map map is enabled (i.e., MEM disabled state) then a compare directly with physical memory occurs.

This instruction will generate a MEMV only if Read protection rules are violated.

Cross Load

```
Mnemonic: XLA, XLB
Octal Code: 101724, 105724
Format:   XLA
          DEF    ADR(,I)
```

Loads the A/B-register from memory. The operand is obtained by resolving ADR(,I) and using the alternate program map for the read operation. If neither the System map nor the User map is enabled (i.e., MEM disabled state) then a load directly from physical memory occurs.

This instruction will generate a MEMV only if Read protection rules are violated.

Transfer Maps Internally per A/B

```
Mnemonic: XMA, XMB
Octal Code: 101722, 105722
Format:   LDA    CTL
          XMA
```

Transfer the entire contents (32 Map registers) of the System map or User map to the port A map or Port B map as determined by the control word in the A/B-register.

| Bit | Significance |
|---|---|
| 15 | System/User (0/1) |
| 0 | Port A/Port B (0/1) |

| 14–1 | Ignored |

This instruction will always generate a MEMV when executed in PM.

Transfer Map or Memory

```
Mnemonic: XMM
Octal Code: 105720
Format:   LDA    FST
          LDB    TBL
          LDX    CNT
          XMM
```

Transfers (CNT) number of words either from sequential memory locations to sequential map registers or from maps to allow re-entry at a later time. The X-register will always be zero at the completion of the instruction; A and B will be advanced by the number of registers moved.

An attempt to load any map register in PM will generate a MEMV. An attempt to store map registers is allowed within the constraints of Write protected memory.

Transfer Maps Sequentially

```
Mnemonic: XMS
Octal Code: 105721
Format:   LDA    FST
          LDB    TBL
          LDX    CNT
          XMS
```

Transfers (CNT) number of words either to sequential map registers or from maps to sequential memory locations. The A-register points to the first register to be accessed. The B-register points to the starting address of the table in memory. The X-register indicates the number of map registers to be affected. A positive quantity will cause the word found in location TBL to be used as a base quantity to be loaded into the first register. The next register will be loaded with the base quantity plus one, and so forth up to (CNT) number of registers. However, if X contains a negative quantity, the map registers are transferred to sequential memory locations on a one-to-one basis as in XMM, beginning with location TBL. Bits 0–9, 14, 15 are used as described in XMM.

An attempt to load any map register in PM will generate a MEMV. An attempt to store map registers is within the constraints of Write Protected memory. to memory. Bits 0-9 of memory correspond to 0-9 of the map and bits 14, 15 of memory relate to bits 10, 11 of the map.

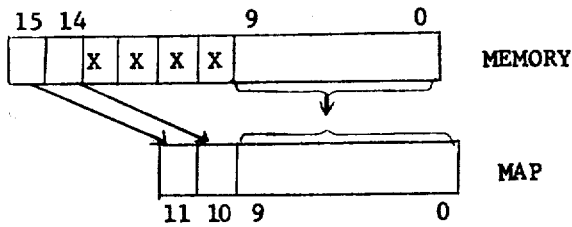

The A-register points to the first register to be accessed. The B-register points to the starting address of the table in memory.

|  |  |
|---|---|
| Port B | 127 |
|  | 96 |
|  | 95 |
| Port A | 64 |
|  | 63 |
| User | 32 |
|  | 31 |
| System | 0 |

Maps are addressed as a contiguous space. Wrap-around from 127 to 0 can and will occur. It is the programmers responsibility to avoid this error. The X-register indicates the number of map registers to be transferred ($1 \leq |\text{CNT}| \leq 128$).

A positive number in X will cause the maps to be loaded with the corresponding data from memory. A negative (two complement) number in X will cause the maps to be stored into the corresponding memory locations.

The instruction is interruptible after each group of 16 registers has been transferred. A, B and X are the reset Cross Store

```
Mnemonic: XSA, XSB
Octal Code: 101725, 105725
Format:   XSA
          DEF    ADR(,I)
```

Store the contents of the A/B-register into memory. The destination is determined by resolving ADR(,I) and using the alternate program map for the write operation. If neither the System map nor the User map is enabled (i.e., MEM disabled state) then a store directly to physical memory occurs.

This instruction will always generate a MEMV when executed in PM.

APPENDIX B

MICROINSTRUCTION FORMATS AND EXECUTION

This section contains a description of the form of microinstruction word types, and a description of the form and effect of each microinstruction field within a word type.

A diagram of the form of each word type is in Table V. Table VI shows the binary and mnemonic form of each field of the microinstruction words.

Word Type 4

Word type 4 performs unconditional jumps or subroutine jumps to any location in the ROM address space. The only difference between JMP and JSB is that JSB causes the SAVE Register to be loaded at P2. At P2, the RAR is loaded with the 12-bit address specified in bits 16–5. However, the address will be modified before loading by one of eight mapping schemes determined by the Special Field.

Work type 4 is determined by the presence of JMP or JSB in the OP Field, and the presence of any Special Field code except CNDX. However, specifying JTAB, RTN, or any other Special Field code which ends with $-110_2$ or $-011_2$ will not result in a direct JMP or JSB, but will load the JTAB or RTN address. This is due to the nature of the address mapping scheme, discussed below.

The three low-order bits of the Special Field (RIR-2-RIR0) constantly control the ROM address multiplexers which select one of eight possible sources to apply to the input of the RAR. This is designed to aid in the implementation of various types of indexed jumps and returns from sub-routines.

TABLE V

CPU MICROINSTRUCTION FORMATS

| WORD TYPE | OP CODE 23 22 21 20 | ALU 19 18 17 16 15 | S-BUS 14 13 12 11 10 | STORE 9 8 7 6 5 | SPECIAL 4 3 2 1 0 |
|---|---|---|---|---|---|
| 1 | ANY OP BUT JMP, JSB, IMM | ANY ALU | ANY S-FIELD | ANY STORE FIELD | ANY NON-JUMP SPECIAL |
| 2 | IMM | PO  UO CI  LI | ← OPERAND FIELD → | ANY STORE FIELD | ANY NON-JUMP SPECIAL |
| 3 | JMP | ANY CONDITION | =0 RJS | ← ADDRESS → (9 BITS) | CNDX |
| 4 | JMP JSB | | ← ADDRESS → (12 BITS) | | ANY JUMP SPECIAL BUT CNDX |

NOTES:
word type 2.
  bit-19: if zero then ALU passes else ones complement.
  bit-18: If zero then upper byte else lower byte.
word type 3.
  bit-14: if zero then reverse jump sense.

TABLE VI

MICROINSTRUCTION MNEMONICS

| BITS POS. → BINARY | 20-23 OP(4) | 0-4 SPECIAL(5) | 15-19 ALU(5) | 15-19 COND(5) | 10-14 S-BUS(5) | 5-9 STORE(5) | 18-19 IMM(2) |
|---|---|---|---|---|---|---|---|
| 00000 | NOP | IOFF | INC | TBZ | TAB | TAB | HIGH |
| 00001 | ARS | SRG2 | OP1 | ONES | CAB | CAB | LOW |
| 00010 | CRS | L1 | OP2 | COUT | T | T | CMHI |
| 00011 | LGS | L4 | ZERO | AL0 | CIR | L | CMLO |
| 00100 | MPY | R1 | OP3 | AL15 | IOI | IOO | |
| 00101 | DIV | ION | OP4 | NMLS | CNTR | CNTR | |
| 00110 | LWF | SRG1 | SUB | CNT8 | DSPL | DSPL | |
| 00111 | WRTE | RES2 | OP5 | FPSP | DSPI | DSPI | |
| 01000 | ASG | STFL | OP6 | FLAG | ADR | IR | |
| 01001 | READ | CLFL | ADD | E | M | M | |
| 01010 | ENV | FTCH | OP7 | OVFL | B | B | |
| 01011 | ENVE | SOV | OP8 | RUN | A | A | |
| 01100 | JSB | COV | OP9 | NHOI | LDR | MEU | |
| 01101 | JMP | RPT | OP10 | SKPF | RES2 | CM | |
| 01110 | IMM | SRGE | OP11 | ASGN | MEU | PNM | |
| 01111 | (BLANK) | NOP | DEC | IR2 | NOP | NOP | |
| 10000 | | MESP | CMPS | NLDR | S1 | S1 | |
| 10001 | | MPCK | NOR | NSNG | S2 | S2 | |
| 10010 | | IOG | NSAL | NINC | S3 | S3 | |
| 10011 | | ICNT | OP13 | NDEC | S4 | S4 | |
| 10100 | | SHLT | NAND | NRT | S5 | S5 | |
| 10101 | | INCI | GMPL | NLT | S6 | S6 | |
| 10110 | | RES1 | XOR | NSTR | S7 | S7 | |
| 10111 | | SRUN | SANL | NRST | S8 | S8 | |
| 11000 | | UNCD | NSOL | NSTB | S9 | S9 | |
| 11001 | | CNDX | XNOR | NSFP | S10 | S10 | |
| 11010 | | JIO | PASL | INT | S11 | S11 | |
| 11011 | | JTAB | AND | SRGL | S12 | S12 | |
| 11100 | | J74 | ONE | RUNE | X | X | |
| 11101 | | J30 | SONL | NOP | Y | Y | |
| 11110 | | RTN | IOR | CNT4 | P | P | |
| 11111 | | JEAU | PASS | NMEU | S | S | |

@ — Any legal code
* — Any legal code except MESP
$ — Any legal code except MEU

TABLE VII

CPU MICROINSTRUCTION

| LABEL | Op | SPEC | ALU | STORE | S-BUS | STATE COMMAND |
|---|---|---|---|---|---|---|
| ● | ● | MESP | @ | MEU | MEU | $Q_0$ |
| ● | @ | MESP | @ | MEU | $ | $Q_1$ |
| ● | ● | MESP | @ | $ | MEU | $Q_2$ |
| ● | @ | MESP | @ | $ | $ | $Q_3$ |
| @ | @ | * | @ | MEU | MEU | $Q_4$ |
| @ | @ | * | @ | MEU | $ | $Q_5$ |
| @ | @ | * | @ | $ | MEU | $Q_6$ |
| @ | * | @ | $ | $ | | $Q_7$ |

Word Type 3

Word Type 3 is distinguished by JMP in the OP Field, and CNDX in the Special Field. RAR8-RAR0 are loaded during P2 with the address specified in RIR13-RIR5 (RAR11-RAR9 unchanged) if the condition specified in the Condition and RJS (Reverse Jump Sense) Fields is met (see section on Conditional Logic). If RJS (RIR14 is 0, then the JMP is taken if the condition is not met.

Condition field mnemonics are described below. Read carefully, as some conditions are met when the signal being tested is false. The condition causing JMP to occur (for RJS=1) is defined after the condition field mnemonic. The actual signal name which is input to the conditional logic on the CPU is included in parenthesis if it is different than the mnemonic of the microinstruction field.

CONDITION MNEMONICS

TBZ (TBZF)
The T-Bus was $000000_8$ after the last word-type 1 or 2 $\mu$-instruction.

ONES (ONESF)
The output of the ALU was $177777_8$ after the last word-type 1 or 2 $\mu$-instruction.

COUT (COUTF)
There was a carry out of the ALU after the last word-type 1 or 2 $\mu$-instruction.

AL0 (ALU0F)
ALU bit 0 was 1 after the last word-type 1 or 2 $\mu$-instruction.

AL15 (ALU15F)
ALU bit 15 was 1 after the last word-type 1 or 2 $\mu$-instruction.

NMLS ($\overline{\text{MLSTF}}$)
Memory power was not lost (condition not met after a power failure where memory power is lost). Memory should be good if met.

CNT8
The counter output is $11111111_2$.

FPSP
Front Panel Special Test. No jump for standard front panel. Signal grounded on the standard front panel.

FLAG (FLAGFF)
The FLAG FF is set.

E (EXFF)
The EXTEND FF is set.

OVFL (OVERFF)
The OVERFLOW FF is set.

RUN (RUNFF)
The RUN FF is set.

NHOI ($\overline{\text{HOI}}$)
There is no interrupt pending and the RUN FF is set.

SKPF
An I/O instruction skip condition (SFS, SFC was met. Met only during I/O control-type instructions.

ASGN ($\overline{\text{ASGN}}$)
Microinstruction skip conditions is met if ASG instruction skip conditions are not met. Meaningful only when executing ASG instructions. $\overline{\text{ASGN}}$ is low if the conditions for an ASG skip are met. For ASG instructions the IR bits which specify skip tests are:
IR0: RSS — Reverse skip sense
IR1: SZ(A/B) — Skip if A/B Register is zero
IR2: IN(A/B) — Increment the A/B Register
IR3: SL(A/B) — Skip if least significant bit (bit 0) of A/B is zero
IR4: SS(A/B) — Skip if sign bit (bit 15) of A/B is zero
IR5: SEZ — Skip if EXTEND bit is zero ASGN tests for all skip conditions at once. So there are 2 conditions which cause the SZ(A/B) test to succeed: either IN(A/B) is to be performed and the A/B Register is all ones, or IN(A/B) is not to be performed and the A/B Register is all zeros.

Then the equation of the skip ($\overline{\text{ASGN}}$ is low) is:
SKIP($\overline{\text{ASGN}}$ low) = (( TBZF·IR2+ONESF·IR2) ⊕IR0)·IR1 + ($\overline{\text{EXFF}}$⊕IR0)·IR5 + MULTIPLEXER SKIP The ASG multiplexer output indicates a skip according to the following combinations of IR4, IR3, and IR0:

| IR4 (SS*) | IR3 (SL*) | IR0 (RSS) | CONDITION CAUSING SKIP |
|---|---|---|---|
| 0 | 0 | 0 | NONE |
| 0 | 0 | 1 | $\overline{\text{IR5·IR1}}$ |
| 0 | 1 | 0 | ALU0F |
| 0 | 1 | 1 | $\overline{\text{ALU0F}}$ |
| 1 | 0 | 0 | ALU15F |
| 1 | 0 | 1 | $\overline{\text{ALU15F}}$ |
| 1 | 1 | 0 | $\overline{\text{ALU0F+ALU15F}}$ |
| 1 | 1 | 1 | ALU0F·ALU15F |

IR2
IR Bit 2 is high.
NOTE: The following 8 mnemonics test the state of front panel buttons. The conditions are met if the buttons are not depressed.
NLDR ($\overline{\text{IBL}}$): IBL button
NSNG($\overline{\text{INSTEP}}$): INSTR STEP button
NINC(INCM) : INC M button
NDEC($\overline{\text{DECM}}$) : DEC M button
NRT($\overline{\text{RIGHT}}$) : RIGHT button
NLT($\overline{\text{LEFT}}$) : LEFT button
NSTR($\overline{\text{STORE}}$) : STORE button
NRST($\overline{\text{DISPLAY}}$) : DISPLAY button ("Restore")
NSTB ($\overline{\text{STROBE}}$)
None of the front panel buttons are depressed.
NSFP ($\overline{\text{SFP}}$)
Non-standard front panel installed. $\overline{\text{SFP}}$ is grounded by the standard front panel.
INT
An interrupt is awaiting service.
SRGL
IR3 is "1" and the ALU bit 0 was 1 after the last word type 1 or 2 $\mu$-instruction. Used as part of the SRG routine to test for skip condition.
RUNE (RUNEN)
The operator key switch is not in the LOCK position.
NOP (GROUND)
Jump if RJS = 0.
CNT4
The low-order 4 bits of the counter are $1111_2$.
NMEU
Special condition reserved for use by memory management.

Word Type 2

This type of microinstruction is distinguished by IMM in the OP Field. The 8-bit literal in RIR17–RIR10 is gated onto the the S-bus and stored into the register specified in the Store Field at the end of the instruction cycle.

RIR18 specifies whether the literal is to be put onto the high (0) or low (1) eight bits of the S-Bus. The other half of the S-bus is all ones, as it is not being driven by any gates. RIR19 specifies whether the S-Bus is to be ones complemented (RIR19=1) through the ALU or passed (RIR19=0). If the store field specifies a register which is loaded off the S-Bus, then the data can not be complemented before storing into the register. (The ALU will still complement however.)

The Special Field is executed as in word type 1 microinstructions.

Word Type 1

This type of microinstruction is used to perform all arithmetic, logical, I/O, and memory operations, and to manage communication with special options like memory protect and memory management.

The signals specified in the OP, ALU and Special Fields are asserted at the output of the field decoders during the microinstruction cycle. They are clocked or gated to function properly with the system.

During P0-P2, RIR10-RIR13 of the S-Bus Field are selected to address the Scratch Pad RAMS. The output of the RAMs is latched into the Holding Register at the end of P2. This data is driven onto the S-Bus if RIR14 is high. RIR14=1 in the S-Bus Field determines that the S-Bus is to be driven by the Scratch Pad Registers (S1–S12, X, Y, P, and S). RIR14=0 in the S-Bus Field selects one of the discrete registers to gate onto the S-Bus. If a timing or resource conflict arises, the FRZ FF (freeze) is set at the end of P2, disabling most CPU clocks, effectively freezing the microinstruction and preventing its completion. FRZ FF is reset at the end of P2 following the end of the conflict, and the instruction may go to completion.

During Direct Memory Access cycles, $\overline{\text{DMAFRZ}}$ is low during T3. This signal inhibits the S-Bus Field decoder and prevents the CPU from driving the S-Bus, so that DCPC may use it. Unless a word type 3 or 4 is being performed at this time, the processor freezes for one cycle.

During P3-P5, RIR8-RIR5 are selected to address the Scratch Pad RAMs, to select which register to store the T-Bus into. The Store Field is disabled by JORJ if JMP or JSB occurs in the OP Field, preventing unselected register alteration.

At P5, the selected register is loaded with the data at its inputs. $\overline{\text{RAMWEN}}$ is low during P5 to load the T-Bus into the Scratch Pads if RIR9 is 1 or if PNM is specified in the Store Field. It is disabled from going low during a CPU freeze, JMP or JSB in the OP Field, or when a Memory Protect Violation (MPV) occurs and the P or S Register is selected by RIR8-RIR5.

The Special Field is decoded unconditionally as long as the microinstruction is in the RIR. Decoder outputs are used for a variety of control functions, and are used at different time periods.

Micro-orders

This section contains a detailed description of the function or effect of each microinstruction mnemonic except for the Condition Field and the Jump Specials. First the mnemonic is given, then the CPU signal name of it in parenthesis by a description of its effect.

OP FIELD

NOP
No connection on CPU. No effect.

ARS ($\overline{\text{ARSOP}}$)
32-bit arithmetic shift. The microinstruction must be in the form

| ARS | PASS | B | B | L1 OR R1 |
|-----|------|------|-------|----------|
| OP  | ALU  | S-BUS| STORE | SPEC     | a. If L1: AS1=1, AS0=0, which shifts the A-Register left 1. The B-Register is passed through the ALU, and is shifted left 1 through the shifter (TBS1-0, TBS0=1), with ALX14=ALU15 and LSI=AR15. The T-Bus is then stored into the B-Register. Overflow is set if ALU14 ≠ ALU15 (sign ≠ original B-Register bit 14). The effect is shown below.

b. If R1: AS1=0, AS0=1, which shifts the A-Register right 1, with B-Register 0 → A-Register 15. A-Register 0 is lost. The B-Register is passed through the ALU, and is shifted 1 right through the shifter (TBS0=0, TBS1=0), with ALX16=ALU15 (sign extended shift). The T-Bus is then stored in the B-Register. The effect is shown as follows:

ARS with L1:

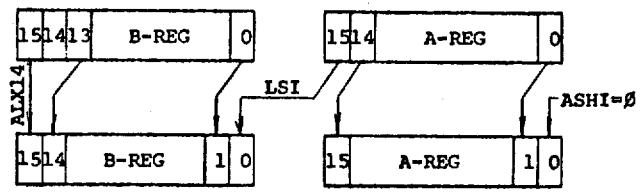

ARS with R1:

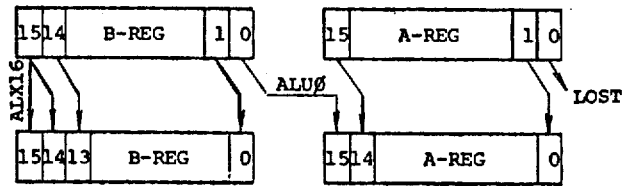

CRS ($\overline{\text{CRSOP}}$)
32-bit circular shift. Requirements:

| CRS | PASS | B | B | L1 OR R1 |
|-----|------|------|-------|----------|
| OP  | ALU  | S-BUS| STORE | SPEC     | a. If L1: AS1=1, AS0=0, which shifts the A-Register left one, with AR0←ASHI=ALU15. The B-Register is passed through the ALU and shifted left in the shifter (TBS1=0, TBS0=1) with ALX14=ALU14 and LSI=AR15. The T-Bus is stored back into the B-Register.

b. If R1: AS1=0, AS0=1, which shifts the A-Register right one, with AR15 ← B-Register 0., B is passed through the ALU then shifted right (TBS0=0, TBS1=0), with ALX16=AR0. The T-Bus is stored back into the B-Register.

CRS with L1:

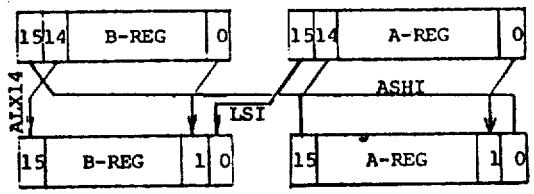

CRS with R1:

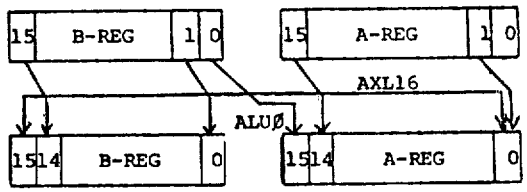

LGS ($\overline{\text{LGSOP}}$)
32-bit logical shift. Requirements:

| LGS | PASS | B | B | L1 OR R1 |
|---|---|---|---|---|
| OP | ALU | S-BUS | STORE | SPEC |

Operation is similar to CRS, ARS above.
a. L1: As B is shifted in the shifter, ALX14=ALU14, LSI=AR15. ASHI shifts 0 into the A-Register.
b. R1: As B is shifted in the shifter, ALX16=0, A-Register 5 ← B-Register 0.

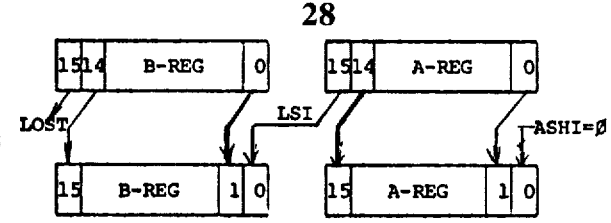

LGS with R1:

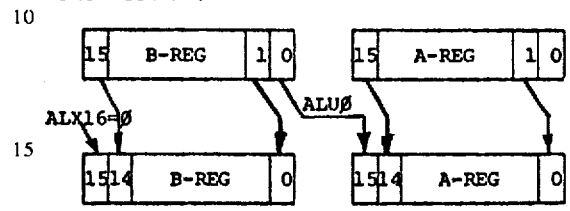

MPY ($\overline{\text{MPYOP}}$)
Multiply step. Normally used in a repeat loop as part of a multiply algorithm. Requirements for proper operation:

| MPY | ADD | B | B | R1 |
|---|---|---|---|---|
| OP | ALU | S-BUS | STORE | SPEC |

The A-Register is shifted right internally, AR1-5 ← ALU0. The B-Register is gated onto the S-Bus. The ALU adds the S-Bus to the L-Register if A-Register bit 0 is a 1, and passes the S-Bus if it is 0. The output of the ALU is shifted right one, with ALX16=COUT (carry out of ALU). This is stored back into the B-Register via the T-Bus.

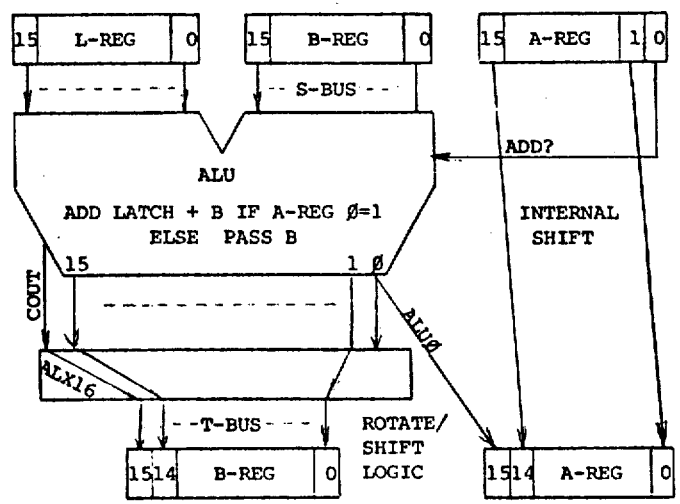

Sixteen repeats will perform the function B+A.L and leave the result in the B and A Registers, least significant bit in A-Register 0 and most significant bit in B-Register 15.

DIV ($\overline{\text{DIVOP}}$)

Divide step. Normally used in a repeat loop as part of a divide algorithm. Requirements for proper operations:

| DIV | SUB | B | B | L1 |
|---|---|---|---|---|
| OP | ALU | S-BUS | STORE | SPEC |

The A-Register is shifted left one internally with ASHI=COUT (carry from ALU). The ALU subtracts the L-Register from the B-Register. The result is shifted left one in the shifter, with ALX-14=ALU14 and LSI=AR15. If COUT=1 (no borrow), then this result is stored into the B-Register via the T-Bus. If COUT=0 (borrow), then the B-Register is shifted left internally (subtraction is effectively not performed), with B-Register bit 0 ← AR15. Sixteen repetitions of this instruction will perform (B,A)÷L=quotient in B, remainder in A assuming (B,A) represents a positive number.

at the following P2. This initiates a read from memory. The M-Register must be loaded prior to or during the instruction with READ in the OP Field. Data must be removed from the T-Register exactly two instruction cycles after READ, or else DCPC could destroy the contents of the T-Register, and memory disables T after that time.

ENV (ENVOP)
Enables the Overflow logic for the current ALU operation. OVER FF is set at the end of P5 if the L-Register and S-Bus have the same sign bit (bit 15) and ALU15 is different. Caution is advised so that the L-Register sign bit is set properly.

ENVE (ENVEOP)
Enables both the Overflow (see above) and Extend logic for the current ALU operation. The EXTEND FF is set at the end of P5 if COUT=1 (carry from the ALU).

JSB (JSBOP)
JMP (JMPOP)

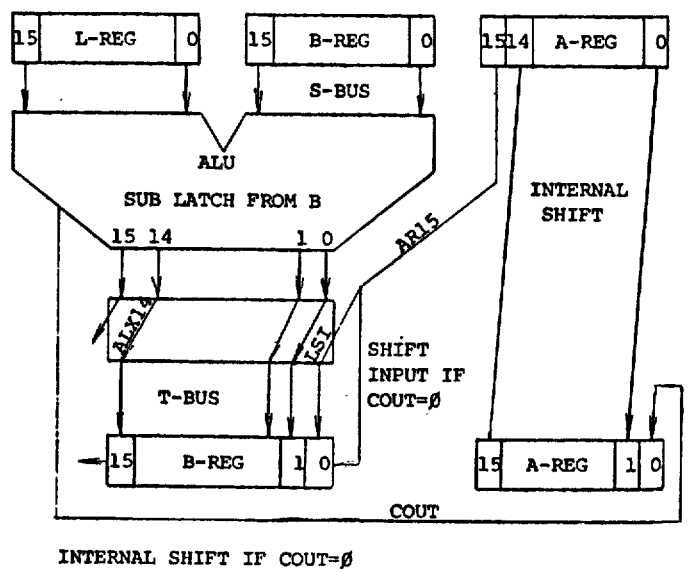

INTERNAL SHIFT IF COUT=0

LWF (LWFOP)
Link with flag. If L1 or R1 is specified in The Special Field, the FLAG FF is linked with the ALU to form a 17-bit rotate through the R/S logic. For L1, LSI=FLAGFF and FLAGFF ← ALU15. For R1, ALX16=FLAG FF and FLAGFF ← ALU0.

WRTE (WRTEOP)
If memory is busy when WRTEOP occurs (REFRESH or MSRDY or DMALO low) the CPU will freeze until memory is free. Then the WRITE FF is set at the end of next P5. The WRITE FF is reset at the following P2. Initiates a write cycle in memory. The T-Register should be loaded in the same instruction in which WRTE is specified, as DCPC could destroy the T-Register contents if it was loaded any earlier.

ASG (ASGOP)
Used during ASG instruction routines. Sets, clears, complements the EXTEND FF according to the combination of IR6, IR7. Also clears the L-Register during P5 so the Overflow/Extend logic will operate correctly during increments.

READ (READOP)
If memory is busy when READOP occurs (REFRESH or MSRDY or DMALO low) the CPU will freeze until memory is free. Then the READ FF will be set at the end of the next P5. It will be reset Specify jump or subroutine jump to new location in microcode. See sections on word types 3, 4. The AND of JSBOP and JMPOP (=JORJ) prevents storing into the scratch pads, disables the Store Field decoder, disables clocking of the Status Flag Register, and enables the RAR loading logic.

IMM (IMMOP)
Specifies word type 2. IMMOP enables the RIR onto the S-Bus, specifies PASS through the ALU or CMPS if RIR19=1, and prevents the Holding Register from driving the S-Bus.

SPECIAL FIELD

The Special Field is used to control special computer options like memory protect and memory management, to control interrupt recognition, to perform special arithmetic/logical operations, to initiate special CPU control features, and to specify jump schemes.

IOFF (ISOFFSP)
Clear the INTEN FF at the end of current instruction. This prevents recognizing of interrupts from devices with select codes greater than 5 (i.e., only memory protect and power fail or HALT mode may force RAR to 4 when a jump to 0 is attempted). Used during the JMP, I and JSB, I machine instruction routines to hold off interrupts until after one more instruction is executed.

SRG2 ($\overline{\text{SRG2SP}}$)

Enables IR bits 0, 1, 2, 4 to the SRG shift/rotate decoder. This sets up a shift or rotate of the ALU onto the T-Bus as required by the SRG instruction.

L1 ($\overline{\text{L1SP}}$)

Sets up a left Shift (TBS0=1, TBS1=0) in the shift multiplexors. Without a qualifying OP Field command (LWF, ARS, CRS, LGS, MPY, DIV), this command shifts as shown below.

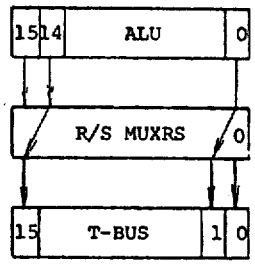

L4 ($\overline{\text{L4SP}}$)

Sets up a circular left shift of 4 bit positions (TBS0=0, TBS1=1) in the shift muliplexors. Rotates the ALU four positions before sending it onto the T-Bus.

R1 ($\overline{\text{R1SP}}$)

Sets up a right shift (TBS0=0, TBS1=0) in the shift multiplexors. Without a qualifying OP Field command (LWF, ARS, CRS, LGS, MPY, DIV), this command shifts as shown below.

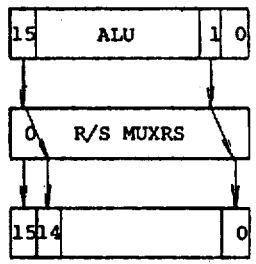

ION ($\overline{\text{IONSP}}$)

Turns on the INTEN FF at the end of current microinstruction. Allows normal interrupts to force the RAR to $4_8$ when a jump or RTN to address $0_8$ is attempted.

SRG1 ($\overline{\text{SRG1SP}}$)

Enables IR bits 9,8,7,6 to the shift/rotate decoder. This sets up a shift or rotate of the ALU onto the T-Bus as required by SRG machine instructions.

RES2 ($\overline{\text{XCHSP}}$)

Not offered to the microprogrammer. Exchange Flag FF with Extend FF.

STFL ($\overline{\text{STFLSP}}$)

Set the CPU Flag FF.

CLFL ($\overline{\text{CLFLSP}}$)

Clear the CPU Flag FF.

FTCH ($\overline{\text{FTCH}}$)

Interface signal to Memory Protect. Results: latch the Violation Register from the M-Bus during P5; clear MPV at the end of P5; reset the indirect counter. To be used while the address of the current machine instruction is on the M-Bus prior to its execution. Used to initialize the memory protect error detection logic.

SOV ($\overline{\text{SOVSP}}$)

Set the Overflow FF.

COV ($\overline{\text{COVSP}}$)

Clear the Overflow FF.

RPT ($\overline{\text{RPTSP}}$)

Set the Repeat FF. The RIR clock is disabled after P5 and the RAR increment is disabled after the following P2. The next microinstruction is repeated and the counter is incremented each succeeding P5 until the low 4 bits of the counter are $1111_2$. Then the Repeat FF is cleared at P4 and normal control is restored. The microinstruction after RPT will be repeated the two's complement of the value in the low 4 bits of the counter (with $0000_2 = 16$ times).

SRGE ($\overline{\text{SRGESP}}$)

Clear the Extend FF if IR5=1.

NOP

No special signals generated.

MESP ($\overline{\text{MESP}}$)

Special purpose signal for use by memory management.

MPCK ($\overline{\text{MPCK}}$)

Memory Protect Check. Interface signal to Memory Protect. Must be specified while the address of an impending memory reference is on the S-Bus. This value is compared against the Fence Register to determine if a violation occurred. If the S-Bus < Fence Register then $\overline{\text{MPV}}$ will go low if memory protect is enabled. If $\overline{\text{MPV}}$ is low, then memory references will not affect memory and memory data will appear as 0, no I/O signals may be generated, and the P and S Registers may not be altered. FTCH or IAK will clear the MPV condition.

IOG ($\overline{\text{IOGSP}}$)

The processor will freeze until T2. At the end of T2, the IO Group Enable FF will be set, enabling I/O signal generation for one I/O cycle.

ICNT ($\overline{\text{ICNTSP}}$)

Increment the Counter

SHLT ($\overline{\text{SHLTSP}}$)

The Run FF will be cleared at the end of the next microinstruction.

INCI ($\overline{\text{INCISP}}$)

The indirect counter is incremented on the Memory Protect board. Used after an indirect address level is detected to keep infinite loops from preventing detection of interrupt requests. The INTEN FF is set after 3 increments.

RESI

No Signal.

SRUN ($\overline{\text{SRUNSP}}$)

Set the Run FF at the end of the current microinstruction.

JTAB ($\overline{\text{JTABSP}}$)

Load the RAR at P2 from the JTAB MAP

RTN ($\overline{\text{RTNSP}}$)

Load the RAR at P2 from the Save Register and clear the Save Register at P5.

STORE AND S-BUS FIELDS

Below is a description of the mnemonics for the S-Bus and Store fields. The scratch registers are S1–S12, X, Y, P, S. Some of the other mnemonics have special meanings and applications, and are described below. The scratch pads are addressed directly by the RIR. The signal name out of the field decoders are indicated in parentheses.

The Store field decoder is disabled by JMP, JSB, or RIR19=1. The S-Bus field decoder is disabled by JMP, JSB, IMM, or $\overline{\text{DMAFRZ}}$ (T3 of a DCPC cycle).

TAB

Store ($\overline{TABST}$) and S-Bus ($\overline{TABEN}$). Selects the T, A, or B Register, depending on the setting of $\overline{AAFF}$ and $\overline{BAFF}$ which are set according to the value of the T-Bus whenever the M-Register is changed. Allows A, B to be accessed instead of locations 0, 1 of main memeory. See description of T below for timing associated with T.

| T-BUS AT STORE INTO M | RESULTANT VALUES $\overline{AAFF}$ | $\overline{BAFF}$ | REGISTER SELECTED BY TAB |
|---|---|---|---|
| 0 | 1 | 1 | T |
| 1 | 0 | 1 | A |
| 2 | 1 | 0 | B |
| >2 | 1 | 1 | T |

CAB

Store ($\overline{CABST}$) and S-Bus ($\overline{CABEN}$). Selects the A-Register if IR-11 is 0, or the B-Register if IR-11 is 1.

T

Store ($\overline{TST}$) and S-Bus ($\overline{TREN}$). If from Store field, $\overline{TST}$ is sent to memory if the processor is not frozen. Used to clock the S-bus into the T-Register. If from S-Bus field, it freezes the processor until memory is ready.

CIR ($\overline{CIREN}$)

Freeze the processor until T6, then during P3-P5, load the CIR from the Interrupt Address Bus, issue IAK and gate the CIR onto the S-Bus, high order 10 bits = 0.

L ($\overline{LST}$)

Load the L-Register from the S-bus.

IOI ($\overline{IOIEN}$)

Drive the S-Bus from the source determined by the Select Code Bus, as shown below. Note: IOIEN will generate IOI on the I/O system (to cause the output buffer to be dumped onto the I/O Bus) only during T4 or T5 and if the IO Group Enable FF is set.

| SELECT CODE BUS | SOURCE SELECTED BY IOI |
|---|---|
| 00 | I/O Bus (=0) |
| 01 | Front Panel Display |
| 02 | DCPC Channel 1 Word Count Register |
| 03 | DCPC Channel 2 Word Count Register |
| 04 | Central Interrupt Register |
| 05 | Memory Protect Violation Register |
| 06 | Nothing = 177777₈ |
| 07 | Nothing = 177777₈ |
| 10₈-77₈ | I/O Bus (loaded from output buffer of I/O device) |

IOO ($\overline{IOOST}$)

This is independent of the IOO signal generated by the I/O signal generators. Gates the S-Bus onto the I/O Bus if the IO Group Enable FF is set.

CNTR

S-Bus ($\overline{CNTREN}$) and Store ($\overline{CNTRST}$). $\overline{CNTRST}$ stores the low order 8 bits of the S-Bus into the counter. $\overline{CNTREN}$ enables the 8-bit counter onto the low 8 bits of the S-Bus. The high 8 bits of the S-Bus are all ones.

DSPL

S-Bus ($\overline{DSPLEN}$), Store ($\overline{DSPLST}$). Selects the front panel Display Register.

DSPI

S-Bus ($\overline{DIEN}$): Selects the Display Indicator Register of the front panel onto bits 5-0 of the S-Bus. Higher order bits are ones. Store ($\overline{DIST}$): Stores the low 6 bits of the S-Bus into the Display Indicator Register on the front panel. High order bits ignored. Note: Bits which are low correspond to LED indicators which are lit on the Display Indicator, as shown below:

| S-BUS BITS LOW WITH DSPI GIVEN | 5 | 4 | 3 | 2 | 1 | 0 |
|---|---|---|---|---|---|---|
| REGISTER INDICATOR LIT | S | P | T | M | B | A |

ADR ($\overline{ADREN}$)

Enable bits 9-0 of the M-Register onto bits 9-0 of the S-Bus. If IR10=0, gates 0's onto bits 15-10 of the S-Bus. If IR10=1, gate M-Register bits 15-10 onto the S-Bus. Performs zero/current page addressing for MRG-type machine instructions.

IR ($\overline{IRST}$)

Load IR from the S-Bus.

M

The M-Register is only 15 bits. When enabled onto the S-Bus, bit 15 is low.

LDR ($\overline{LDREN}$)

Enable the complement of the contents of the loader ROM selected by IR15, IR14, and addressed by counter bits 7-0 onto the S-Bus bits 3-0. Bits 15-4 will be pulled high.

MEU ($\overline{MEST}$)

Memory expansion unit loaded from S-Bus.

RES2

No register drives S-Bus. S-Bus is 177777₈.

CM ($\overline{CMST}$)

Store S-Bus into M-Register if and only if the IR contains an MRG-type instruction but not jump direct. In hardware, M is loaded if $\overline{CMST}$ is low and (IR12+IR14+IR13(IR15+IR11)=1.

MEU ($\overline{MEEN}$)

Memory expansion unit is gated onto S-Bus.

PNM ($\overline{PNMST}$)

Load the S-Bus into M-Register and the T-Bus into the P-Register (part of the scratch pads).

S1-S12

X, Y, P, S

These registers are all in the four 16×4 bit scratch pad registers and are addressed by the RIR through a multiplexer.

ALU FIELD

The ALU field feeds directly into the ALU without decoding. The ALU continuously performs the operation specified by RIR19-15, except that this may be overridden by a IMM or MPY microinstruction to do a PASS or CMPS instead. The operations possible are shown below (S = S-Bus, L L-Register). Arithmetic is 2's - complement, + = logical OR.

| INC | S PLUS 1 |
|---|---|
| OP1 | (S+L) PLUS 1 |
| OP2 | (S+$\overline{L}$) PLUS 1 |
| ZERO | ALL ZERO OUTPUT |
| OP3 | S PLUS (S·L) PLUS 1 |
| OP4 | (S+$\overline{L}$) PLUS (S·$\overline{L}$) PLUS 1 |
| SUB | S MINUS L |
| OP5 | S·L |
| OP6 | S PLUS (S·L) |
| ADD | S PLUS L |
| OP7 | (S+$\overline{L}$) PLUS (S·L) |
| OP8 | S·L MINUS 1 |

-continued

| OP9 | S PLUS S (LOGICAL LEFT SHIFT) |
|---|---|
| OP10 | (S+L) PLUS S |
| OP11 | (S+L̄) PLUS S |
| DEC | S MINUS 1 |

Note: The following are logical operations.

| CMPS | NOT S |
|---|---|
| NOR | NOT (S OR L) |
| NSAL | (NOT S) AND L |
| OP13 | ALL ZERO |
| NAND | NOT (S AND L) |
| CMPL | NOT L |
| XOR | S (EXCLUSIVE — OR) L |
| SANL | S AND (NOT L) |
| NSOL | (NOT S) OR L |
| XNOR | NOT (S (EXCLUSIVE — OR) L) |
| PSAL | L |
| AND | S AND L |
| ONE | ALL ONES |
| SONL | S OR (NOT L) |
| IOR | S OR L |
| PASS | S |

M-REGISTER OPERATION

The M-Register must be loaded with the address of main memory The M-Register must be loaded with the address of main memory to be read before the READ micro-order occurs, or concurrent with it. The M-Register will be loaded at the start of P4. If the CM micro-order is used, M will be loaded only if an MRG-type instruction is in the IR. M may be altered after a reference is initiated, as the M-Bus is clocked into a holding register in memory after 200 μsec into the memory cycle. The M-Register must be loaded prior to using a WRTE command, because write data is being loaded into T when WRTE is given.

TAB Logic

Whenever M is loaded, the A-Addressable and B-Addressable flip-flops (AAFF, BAFF) are set according to the value of the T-Bus as shown below.

| T-BUS | AAFF | BAFF |
|---|---|---|
| 1 | 1 | 0 |
| 2 | 0 | 1 |
| OTHER | 0 | 0 |

These flip-flops determine whether the A, B, or T-register will be used when the TAB micro-order is specified (because the A, B registers are addressed as locations 0, 1 of memory although they are actually hardware registers). If M could be receiving 0 or 1, the INC micro-order should be used in the ALU field. This T-Bus scheme with INC is used to simplify operand fetches during instruction execution. The standard sequence is shown below:

| READ | INC | PNM | P | | M | P, P | P+1, set TAB logic, initiate READ |
|---|---|---|---|---|---|---|---|
| (wait) | | | | | | | |
| | PASS | S1 | | TAB | | | Get data from T, A, or B-Register, according to TAB logic. |

READ OPERATIONS

Freezes MSRDY (Memory Soon Ready) is high by P2 if memory is ready for another reference by the end of the next P5. If it is not high by P2, or DMALO is low, or REFRESH is low (memory refreshing), then a freeze will occur if READ is specified, until it is safe to proceed.

Initiation

A memory read cycle is initiated by the READ FF at the end of P5 when the READ micro-order is specified. READ is low from P5 through P1, but the falling edge initiates the cycle.

Data Retrieval

Data must be retrieved from memory exactly two microinstructions past the READ. After this time, memory disables the T-Register. If the T or TAB (if AAFF=BAFF=0) micro-orders are in the S-Bus field, and MSRDY is low, a freeze will occur until MSRDY is high. If the TAB logic specifies A or B, then the T-Register is not referenced at all, and no freeze will occur. Location 0, 1 of main memory may be referenced if the TAB logic is not used as prescribed.

WRITE OPERATIONS

Freezes

The WRTE micro-order requires the same freeze operation as READ.

Initiation

A write cycle is initiated by the WRITE FF at the end of P5 when the WRTE micro-order is given. WRITE is low from P5 through P1, but the falling edge of P5 initiates the cycle.

APPENDIX C

| LINE | LABEL | | MACRO JUMP POINT AND MNEMONIC | | | | BINARY CODE |
|---|---|---|---|---|---|---|---|
| 0001 | NEUMACRO | JMP | J30 | | | JTABL | 1000X0111100XXXX |
| 0002 | | JMP | STFL | | | XMM | 1000X01111010001 |
| 0003 | | JMP | | | | XM* | 1000X01111010010 |
| 0004 | | | RTN | | | | 1000X01111010011 |
| 0005 | | JMP | | | | XL* | 1000X01111010100 |
| 0006 | | JMP | | | | XS* | 1000X01111010101 |
| 0007 | | JMP | | | | XC* | 1000X01111010110 |
| 0008 | | JMP | | | | LF* | 1000X01111010111 |
| 0009 | RS* | | | PASS | MEU | MEU | 1000X01111011000 |
| 0010 | RV* | | RTN | PASS | CAB | MEU | 1000X01111011001 |
| 0011 | | JMP | | | | DJP | 1000X01111011010 |
| 0012 | | JMP | | | | DJS | 1000X01111011011 |
| 0013 | | JMP | | | | SJP | 1000X01111011100 |
| 0014 | | JMP | | | | SJS | 1000X01111011101 |

APPENDIX C-continued

| LINE | LABEL | | | MACRO JUMP POINT AND MNEMONIC | | BINARY CODE |
|---|---|---|---|---|---|---|
| 0015 | | JMP | | | UJP | 1000X01111011110 |
| 0016 | | JMP | | | UJS | 1000X01111011111 |
| 0017 | JTABL | JMP | | | XMM | 1000X011110X0000 |
| 0018 | | | RTN | | | 1000X01111000001 |
| 0019 | | JMP | | | MBI | 1000X01111000010 |
| 0020 | | JMP | | | MBF | 1000X01111000011 |
| 0021 | | JMP | MESP | | MBW | 1000X01111000100 |
| 0022 | | JMP | | | MWI | 1000X01111000101 |
| 0023 | | JMP | MESP | | MWI | 1000X01111000110 |
| 0024 | | JMP | MESP | | MWW | 1000X01111000111 |
| 0025 | | JMP | | | SY* | 1000X01111001000 |
| 0026 | | JMP | | | US* | 1000X01111001001 |
| 0027 | | JMP | | | PA* | 1000X01111001010 |
| 0028 | | JMP | | | PB* | 1000X01111001011 |
| 0029 | | JMP | | | SSM | 1000X01111001100 |
| 0030 | | JMP | | | JRS | 1000X01111001101 |
| 0031 | | | RTN | | | 1000X01111001110 |
| 0032 | | | RTN | | | 1000X01111001111 |
| 0033 | | JSB | | | OPGET | **UTILITY** |

| LINE | LABEL | | | MICROINSTRUCTIONS | | COMMENTS |
|---|---|---|---|---|---|---|
| 0034 | XMM | | | PASS | S3 | P | S3 <= P; SAVE P |
| 0035 | | | | CMPS | S2 | X | S2 <= ONE'S COMP OF COUNT |
| 0036 | | JMP | CNDX | ONES | | RTN* | TEST FOR ZERO COUNT |
| 0037 | | IMM | | LOW | L | %200 | L <= 1111111110000000 |
| 0038 | | | | SANL | S1 | A | MASK LOW 7 BITS OF A-REG |
| 0039 | | IMM | | HIGH | L | %337 | L <= 1101111111111111 |
| 0040 | | | | SONL | S1 | S1 | ADD CONTROL BIT (13) |
| 0041 | | | | PASS | MEU | S1 | MEM ADDR REG <= S1 |
| 0042 | | | | PASS | P | B | P <= B(TABLE ADDRESS) |
| 0043 | | | | PASS | CNTR | S2 | CNTR <= S2 |
| 0044 | | JMP | CNDX | FLAG | | XMS | TEST FOR XMS INSTRUCTION |
| 0045 | | JMP | CNDX | AL15 | RJS | READMAP | TEST FOR NEGATIVE COUNT |
| 0046 | | READ | | INC | PNK | P | READ FIRST WORD P<=P+1 |
| 0047 | MELOOP1 | | | PASS | S4 | TAB | S4 <= MAP DATA |
| 0048 | | | MESP | PASS | MEU | S4 | MAP REG <= DATA |
| 0049 | | READ | ICNT | INC | PNM | P | READ NEXT WORD) INC CNTR AND P |
| 0050 | | JMP | CNDX | CNT4 | RJS | MELOOP1 | LOOP FOR 16X |
| 0051 | | JMP | CNDX | CNT8 | | XMM,RTN | IS TOTAL LOOP FINISHED |
| 0052 | | READ | | | | | RESTART THE READ AT SAME ADDR |
| 0053 | | JMP | CNDX | INT | RJS | MELOOP1 | TEST FOR NO INTERRUPT |
| 0054 | | | | DEC | S3 | S3 | RESET P REGISTER FOR RESTART |
| 0055 | | JMP | | | | SMM,RTN | ELSE SERVICE INTERRUPT |
| 0056 | XXM,RTN | | | PASS | 8 | M | RESET B-REG |
| 0057 | XMS,RTN | | | INC | S1 | CNTR | S1 <= REMAINING COUNT (2'S COMP) |
| 0058 | | | | PASS | L | X | L <= ORIGINAL COUNT (POSITIVE) |
| 0059 | | | | CMPS | X | CNTR | X <= REMAINING COUNT (POSITIVE) |
| 0060 | | | | ADD | S1 | S1 | S1 <= ORIGINAL - REMAINING |
| 0061 | | | | PASS | L | S1 | L <= WORDS COMPLETED |
| 0062 | | | | ADD | A | A | A <= A + TOTAL COMPLETED |
| 0063 | P.RTN | | RTN | PASS | P | S3 | P <= NEXT INSTRUCTION |
| 0064 | XMS | JMP | CNDX | AL15 | RJS | P.RTN | TEST FOR X 0 ... NOP |
| 0065 | MELOOP2 | | MESP | PASS | MEU | B | MAP REG <= DATA |
| 0066 | | | ICNT | INC | B | B | B <= B + 1; INC CNTR |
| 0067 | | JMP | CNDX | CNT4 | RJS | MELOOP2 | LOOP FOR 16X |
| 0068 | | JMP | CNDX | CNT8 | | XMS,RTN | IS TOTAL LOOP FINISHED |
| 0069 | | JMP | CNDX | INT | RJS | MEL00P2 | TEST FOR NO INTERRUPT |
| 0070 | | | | DEC | S3 | S3 | RESET P REGISTER FOR RESTART |
| 0071 | | JMP | | | | XMS,RTN | ELSE SERVICE INTERRUPT |
| 0072 | READMAP | | | DEC | S4 | X | S4 <= X-1 |
| 0073 | | | | PASS | CNTR | S4 | CNTR <= CNT+1 (TWO'S COMP) |
| 0074 | MELOOP3 | | MPCK | INC | PNM | P | M.P. CHECK: P <= P+1 |
| 0075 | | | MESP | PASS | S1 | MEU | S1 <= MAP REG |
| 0076 | | WRTE | ICNT | PASS | TAB | S1 | WRITE DATA INTO TABLE |
| 0077 | | JMP | CNDX | CNT4 | RJS | MELOOP3 | LOOP FOR 16X |
| 0078 | | JMP | CNDX | CNT8 | | XMM,RTN* | |
| 0079 | | JMP | CNDX | INT | RJS | MELOOP3 | TEST FOR NO INTERRUPT |
| 0080 | | | | DEC | S3 | S3 | RESET P REGISTER FOR RESTART |
| 0081 | * | JMP | | | | XMM,RTN* | ELSE SERVICE INTERRUPT |
| 0082 | * | | | | | | |
| 0083 | XMM,RTN* | | | PASS | B | P | RESET B-REG |
| 0084 | | | | PASS | L | X | L <= ORIGINAL COUNT (NEGATIVE) |
| 0085 | | | | INC | X | CNTR | X <= REMAINING COUNT (2's COMP) |
| 0086 | | | | SUB | S1 | X | S1 <= ORIGINAL - REMAINING |
| 0087 | | | | PASS | L | S1 | L <= WORDS COMPLETED |
| 0088 | | | | ADD | A | A | A <= A + TOTAL COMPLETED |
| 0089 | | | RTN | PASS | P | S3 | P <= NEXT INSTRUCTION |
| 0090 | XM* | IMM | | CMHI | SL | %337 | S1 <= 0010000000000000 |
| 0091 | | LWF | L1 | PASS | | CAB | T-BUS <= A/B; FLAG <= A/B(15) |

APPENDIX C-continued

| LINE | LABEL | | MICROINSTRUCTIONS | | | COMMENTS |
|------|-------|------|------|------|------|----------|
| 0092 | PA.PB | JMP | CNDX ALO | RJS | SY.US | TEST FOR PORT A MAP |
| 0093 |  | IMM |  LOW | L | %177 | L <= 1111111101111111 |
| 0094 |  |  | SONL | S1 | S1 | S1 <= 0010000010000000 |
| 0095 | SY.US | JMP | CNDX FLAG | RJS | XFER | TEST FOR SYSTEM MAP |
| 0096 |  | IMM | LOW | L | %337 | L <= 1111111111011111 |
| 0097 |  |  | SONL | S1 | S1 | S1 <= 00100000X0100000 |
| 0098 | XFER |  | PASS | MEU | S1 | MEM ADDR REG <= S1(7–0) |
| 0099 |  | IMM | RPT LOW | CNTR | %000 | CNTR <= 0; SET REPEAT FF FOR 16X |
| 0100 |  |  | MESP PASS | MEU | MEU | MEM PORT REG = MEM PROG REG |
| 0101 |  | IMM | RPT LOW | CNTR | %000 | CNTR <= 0; SET REPEAT FF FOR 16X |
| 0102 |  |  | MESP PASS | MEU | MEU | MEM PORT GET <= MEM PROG REG |
| 0103 | RTN* |  | RTN |  |  | RETURN |
| 0104 |  | JSB |  |  | OPGET | GET OPERAND ADDR FROM INSTR + 1 |
| 0105 |  |  | MESP INC | P | P |  |
| 0106 |  | READ | INC | M | M | SWITCH MAPS; GET REAL OPERAND |
| 0107 |  |  | PASS | MEU | MEU | RESET MAP STATE |
| 0108 |  |  | RTN PASS | CAB | TAB |  |
| 0109 | XS* | JSB |  |  | OPGET | GET OPERAND ADDR FROM INSTR + 1 |
| 0110 |  |  | MESP INC | P | P | SWITCH MAP STATE |
| 0111 |  |  | MPCK INC | M | M |  |
| 0112 |  | WRTE | PASS | TAB | CAB |  |
| 0113 |  |  | RTN PASS | MEU | MEU | RESET MAP STATE |
| 0114 | XC* | JSB |  |  | OPGET | GET OPERAND ADDR FROM INSTR + 1 |
| 0115 |  |  | MESP PASS | L | CAB | L <= A/B; SET ALTERNATE MAP |
| 0116 |  | READ | INC | M | M | GET REAL OPERAND |
| 0117 |  |  | MESP INC | P | P | P <= INSTR + 1; RESET MAP |
| 0118 |  |  | XOR |  | TAB | COMPARE A/B WITH MEMORY |
| 0119 |  | JMP | CNDX TBZ |  | RTN* | RTN-DON'T SKIP IF EQUAL |
| 0120 |  |  | RTN INC | P | P | P <= INSTR + 2; RETURN |
| 0121 | LF* | IMM | HIGH | L | %007 | L <= 0000011111111111 |
| 0122 |  |  | AND | S1 | CAB | S1 <= A/B(10–0) |
| 0123 |  |  | PASS | MEU | MEU | SEND "FENCE" DIRECTIVE |
| 0124 |  |  | RTN PASS | MEU | S1 | MEM FENCE <= S1; RETURN |
| 0125 | DJP | IMM | HIGH | S2 | %100 | S2 <= 0100000011111111 |
| 0126 |  | JMP |  |  | JP* |  |
| 0127 | SJP | IMM | HIGH | S2 | %102 | S2 <= 0100001011111111 |
| 0128 |  | JMP |  |  | JP* |  |
| 0129 | UJP | IMM | HIGH | S2 | %103 | S2 <= 0100001111111111 |
| 0130 | JP* | JSB | IOFF |  | OPGET | GET OPERAND ADDR FROM INSTR + 1 |
| 0131 | SETSTAT |  | PASS | MEU | S2 | MEM STATUS IS SET HERE |
| 0132 |  |  | MPCK PASS |  | M | S-BUS <= ADDRESS; CHECK TARGET |
| 0133 |  |  | RTN PASS | P | M | P <= TARGET ADDRESS; RETURN |
| 0134 | DJS | IMM | HIGH | S2 | %100 | S2 <= 0100000011111111 |
| 0135 |  | JMP |  |  | JS* |  |
| 0136 | SJS | IMM | HIGH | S2 | %102 | S2 <= 0100001011111111 |
| 0137 |  | JMP |  |  | JS8 |  |
| 0138 | UJS | IMM | HIGH | S2 | %103 | S2 <= 0100001111111111 |
| 0139 | JS* | JSB | IOFF |  | OPGET | GET OPERAND ADDR FROM INSTR + 1 |
| 0140 |  |  | INC | S3 | P | S3 <= RETURN ADDRESS |
| 0141 |  |  | PASS | MEU | S2 | MEM STATUS IS SET HERE |
| 0142 |  |  | MPCK PASS |  | M | S-BUS <= ADDRESS; CHECK TARGET |
| 0143 |  | WRTE | PASS | TAB | S3 | WRITE RETURN ADDR AT TARGET |
| 0144 |  |  | RTN INC | P | M | P <= TARGET + 1 |
| 0145 | MBF | IMM | MESP HIGH | L | %000 | L <= 0000000011111111; SET ALT MAP |
| 0146 | MBI |  | R1 PASS | A | A | A <= SOURCE WORD ADDRESS |
| 0147 |  |  | R1 PASS | B | B | B <= DESTINATION WORD ADDRESS |
| 0148 |  | LWF | R1 PASS | X | X | X <= WORD COUNT; FLAG <= ODD BYTE |
| 0149 |  | JSB |  |  | X.LOOP-1 | MOVE BYTES IN PAIRS |
| 0150 |  |  | PASS |  | X | T-BUS <= X |
| 0151 |  | JMP | CNDX TBZ | RJS | B.RESET | TEST FOR INTERRUPTED MOVE |
| 0152 |  | JMP | CNDX FLAG | RJS | B.RESET +1 | TEST FOR NO ODD BYTE |
| 0153 |  |  | MESP PASS |  | ADR | ALO <= IR(O); SET ALTERNATE MAP |
| 0154 |  | JMP | CNDX ALO |  | *+2 | TEST FOR MBF INSTRUCTION |
| 0155 |  | IMM | MESP HIGH | L | %000 | L <= 0000000011111111; SET ALT MAP |
| 0156 |  | READ | INC | M | A | M <= SOURCE ADDRESS |
| 0157 |  |  | L1 PASS | A | A | FORM BYTE ADDRESS IN A |
| 0158 |  |  | SANL | S2 | TAB | S2 <= AAAAAAAA00000000 |
| 0159 |  | JMP | MESP |  | MB* |  |
| 0160 | MBW |  | R1 PASS | A | A | A = SOURCE WORD ADDRESS |
| 0161 |  |  | R1 PASS | B | B | B <= DESTINATION WORD ADDRESS |

APPENDIX C-continued

| LINE | LABEL | MICROINSTRUCTIONS | | | | COMMENTS |
|---|---|---|---|---|---|---|
| 0162 | | LWF | R1 | PASS X | X | X <= WORD COUNT; FLAG <= ODD BYTE |
| 0163 | | JSB | | | W.LOOP-1 | MOVE BYTES IN PAIRS |
| 0164 | | | MESP | PASS | X | T-BUS <= X; SELECT ALTERNATE MAP |
| 0165 | | JMP | CNDX | TBZ RJS | B.RESET | TEST FOR INTERRUPTED MOVE |
| 0166 | | JMP | CNDX | FLAG RJS | B.RESET +1 | TEST FOR NO ODD BYTE |
| 0167 | | IMM | | HIGH L | %000 | L <= 0000000011111111 |
| 0168 | | READ | | PASS M | A | M <= SOURCE ADDRESS |
| 0169 | | | L1 | PASS A | A | FORM BYTE ADDRESS IN A |
| 0170 | | | | SANL S2 | TAB | S2 <= AAAAAAAA00000000 |
| 0171 | MB* | READ | MPCK | INC M | B | M <= DESTINATION ADDRESS |
| 0172 | | | L1 | PASS B | B | FORM BYTE ADDRESS IN B |
| 0173 | | | | AND S1 | TAB | S1 = 00000000BBBBBBBB |
| 0174 | | | | PASS L | S1 | L <= S1 |
| 0175 | | | | IOR S2 | S2 | S2 <= AAAAAAAABBBBBBBB |
| 0176 | | WRTE | | PASS TAB | S2 | |
| 0177 | | | | PASS MEU | MEU | RESET SELECTED MAP |
| 0178 | | | | INC A | A | A <= A + 1 |
| 0179 | | | RTN | INC B | B | B <= B + 1 |
| 0180 | B.RESET | LWF | L1 | PASS X | X | |
| 0181 | | | L1 | PASS A | A | |
| 0182 | | | L1 | PASS B | B | |
| 0183 | | | RTN | PASS MEU | MEU | RESET SELECTED MAP; RETURN |
| 0184 | MWI | | | PASS | X | T-BUS <= X |
| 0185 | | JMP | CNDX | TBZ | MW* | TEST FOR X=0 |
| 0186 | X.LOOP | READ | | INC M | A | READ SOURCE WORD |
| 0187 | | | MESP | INC A | A | INCR. SOURCE ADDR; SWITCH MAPS |
| 0188 | | | | PASS S2 | TAB | S2 <= DATA |
| 0189 | | | MPCK | INC M | B | M.P. CHECK; M <= DEST ADDRESS |
| 0190 | | WRTE | | PASS TAB | S2 | WRITE DATA INTO DESTINATION |
| 0191 | | | | INC B | B | INCREMENT DESTINATION ADDRESS |
| 0192 | | | MESP | DEC X | X | DECREMENT COUNT; SWITCH MAPS |
| 0193 | | JMP | CNDX | TBZ | MW* | TEST IF MOVE COMPLETE |
| 0194 | | JMP | CNDX | INT RJS | X.LOOP | TEST FOR NO INTERRUPT |
| 0195 | | | | DEC P | P | P<= INSTR ADDR |
| 0196 | | | RTN | PASS MEU | MEU | RESET SELECTED MAP; RETURN |
| 0197 | MWW | | | PASS | X | SET ALTERNATE MAP; T-BUS <= X |
| 0198 | | JMP | CNDX | TBZ | MW* | TEST FOR X=0 |
| 0199 | Y.LOOP | READ | | INC M | A | READ SOURCE WORD |
| 0200 | | | | INC A | A | INCREMENT SOURCE ADDRESS |
| 0201 | | | | PASS S2 | TAB | S2 <= DATA |
| 0202 | | | MPCK | INC M | B | M.P. CHECK; M <= DEST ADDRESS |
| 0203 | | WRTE | | PASS TAB | S2 | WRITE DATA INTO DESTINATION |
| 0204 | | | | INC B | B | INCREMENT DESTINATION ADDRESS |
| 0205 | | | | DEC X | X | DECREMENT COUNT |
| 0206 | | JMP | CNDX | TBZ | MW* | TEST IF MOVE COMPLETE |
| 0207 | | JMP | CNDX | INT RJS | W.LOOP | TEST FOR NO INTERRUPT |
| 0208 | | | | DEC P | P | P <= INSTR ADDR |
| 0209 | MW* | | RTN | PASS MEU | MEU | RESET SELECTED MAP; RETURN |
| 0210 | SY* | IMM | | CMHI S1 | %337 | S1 <= 001000000000000 |
| 0211 | | JMP | | | MAPMOVE | |
| 0212 | PA* | IMM | R1 | CMHI S1 | %176 | S1 <=010000010000000 |
| 0213 | | | R1 | PASS S1 | S1 | S1 <= 0010000001000000 |
| 0214 | | JMP | | | MAPMOVE | |
| 0215 | PB* | IMM | | LOW S1 | %237 | S1 <= 1111111110011111 |
| 0216 | | JMP | | | US*+1 | L <= 1101111111111111 |
| 0217 | | | | | | S1 <= 0010000001100000 |
| 0218 | US* | IMM | | LOW S1 | %337 | S1 <= 1111111111011111 |
| 0219 | | IMM | | HIGH L | %337 | L <= 1101111111111111 |
| 0220 | | | | XOR S1 | S1 | S1 <= 0010000000100000 |
| 0221 | MAPMOVE | | | PASS MEU | S1 | MEM ADDR REG <= S1 |
| 0222 | | IMM | | LOW CNTR | %337 | CNTR <= 11011111 (−41B) |
| 0223 | | | | PASS S3 | P | S3 <= P |
| 0224 | | | | PASS P | CAB | P <= A/B |
| 0225 | | JMP | CNDX | AL15 | MELOOP5 | AL15=1 => READ MAPS |
| 0226 | | READ | | INC PNM | P | READ FIRST WORD; P. <= P + 1 |
| 0227 | MELOOP4 | | | PASS S4 | TAB | S4 <= MAP DATA |
| 0228 | | | MESP | PASS MEU | S4 | MAP REG <= DATA |
| 0229 | | READ | ICNT | INC PNM | P | READ NEXT WORD; P <= P + 1 |
| 0230 | | JMP | CNDX | CNTB RJS | MELOOP4 | LOOP FOR 32X |
| 0231 | | | | PASS CAB | M | A/B <= A/B + 32 |
| 0232 | | | RTN | PASS P | S3 | P <= INSTR + 1 |
| 0233 | MELOOP5 | | MPCK | INC PNM | P | M.P. CHECK; P <= P + 1 |
| 0234 | | | MESP | PASS S1 | MEU | S1 <= MAP REG |
| 0235 | | WRTE | ICNT | PASS TAB | S1 | WRITE DATA INTO TABLE |
| 0236 | | JMP | CNDX | CNT8 RJS | MELOOP5 | LOOP FOR 32X |
| 0237 | | | RTN | PASS CAB | P | A/B <= A/B + 32 |
| 0238 | | | RTN | PASS P | S3 | P <= INSTR + 1 |

APPENDIX C-continued

| LINE | LABEL | MICROINSTRUCTIONS | | | | COMMENTS |
|---|---|---|---|---|---|---|
| 0239 | SSM | JSB | | | OPGET | GET OPERAND ADDR FROM INSTR + 1 |
| 0240 | | MPCK | PASS | | M | M.P. CHECK BEFORE WRITE |
| 0241 | | | PASS | MEU | MEU | SEND "STATUS" DIRECTIVE |
| 0242 | | WRTE | PASS | TAB | MEU | WRITE STATUS WORD INTO MEMORY |
| 0243 | | | RTN INC | P | P | P <= INSTR + 2; RETURN |
| 0244 | JRS | JSB | IOFF | | OPGET | GET OPERAND ADDR FROM INSTR + 1 |
| 0245 | | READ | INC | M | M | READ THE STATUS WORD |
| 0246 | | IMM | HIGH | S2 | %103 | S2 <= 0100001111111111 |
| 0247 | | LWF | L1 PASS | S1 | TAB | FLAG <= STAT(15); S1 (15) (= STAT(14) |
| 0248 | | READ | INC | M | S3 | READ JMP TARGET |
| 0249 | | JSB | | | OPGET+2 | GET TARGET ADDR FROM INSTR + 2 |
| 0250 | ON.OFF | JMP | CNDX FLAG | | SY.USR | TEST IF MEM WAS ON |
| 0251 | | IMM | HIGH | S2 | %101 | IF OFF, S2 <= 0100000011111111 |
| 0252 | SY.USR | LWF | R1 PASS | S1 | S1 | S1 <= STAT; AL15 <= STAT(14) |
| 0253 | | JMP | CNDX AL15 | | SETSTAT | TEST STAT(14) FOR USER SELECTED |
| 0254 | | IMM | HIGH | L | %102 | IF SYS, L <= 0100001011111111 |
| 0255 | | | AND | S2 | S2 | THEN S2 <= 010000X011111111 |
| 0256 | | JMP | | | SETSTAT | SET STATUS OF MEM: ALSO SET P |
| 0257 | OPGET | READ | INC | M | P | |
| 0258 | | | INC | S3 | P | S3 <= P + 1; S3 <= INSTR + 2 |
| 0259 | | | PASS | M | TAB | M <= NEXT ADDR |
| 0260 | | JMP | CNDX AL15 | RJS | RTH* | TEST FOR NO INDIRECT REFERENCE ONLY |
| 0261 | | JMP | | | INDLEVEL | |
| 0262 | | LISTING OF INDLEVEL ROUTINE FOR REFERENCE ONLY | | | | |
| 0263 | INDLEVEL | READ | INC | M | M | READ NEXT LEVEL |
| 0264 | | JMP | CNDX NHOI | RJS | IND2 | HALT OR INTERRUPT |
| 0265 | INDIRECT | | CNDX PASS | M | TAB | M(=T/A/B; INCR INDIRECT COUNTER |
| 0266 | | JMP | CNDX AL15 | | INDLEVEL | CHECK FOR ANOTHER LEVEL OF INDIRECT |
| 0267 | | READ | RTN INC | M | M | READ EFFECTIVE ADDRESS, RETURN |
| 0268 | IND2 | | INCI PASS | M | TAB | M<=T/A/B/; INCR INDIRECT COUNTER |
| 0269 | | JMP | CNDX NSNG | RJS | INDIRECT +1 | JUMP BACK FOR SINGLE INSTRUCTION |
| 0270 | | | DEC | P | P | RESET P |
| 0271 | | JMP | | | HORI | HALT OR INTERRUPT |

I claim:

1. An apparatus for translating a logical memory address, each having a logical page address portion and a word address portion, from a central processing unit into a physical memory address, having a physical page address portion and the word address portion, said apparatus comprising:
   a plurality of translating means having enabled and disabled states for providing the physical page address portion of the physical memory address in response to the logical page address portion of the logical memory address; and
   an enabling and addressing circuit coupled to the central processing unit for receiving command signals and the logical page address portion of the logical memory address therefrom, and coupled to the translating means for providing control signals and the logical page address portion of the logical memory address thereto, said enabling and addressing circuit including a state circuit for storing electrical signals representing the present state of said translating means whenever that state is altered to a new state by said command signals, said electrical signals being useful for subsequently restoring the translating means to the present state.

2. The apparatus of claim 1 wherein the enabling and addressing circuit also provides a first electrical signal having a first and a second logic state, said second logic state indicating that one of the plurality of translating means is enabled, said apparatus further comprising: selection means coupled to the translating means for providing the logical page address portion of the logical memory address in response to the first logic state and for providing the physical page address portion of the physical memory address in response to the second logic state of the first signal.

3. The apparatus of claim 2 wherein:
   the enabling and addressing circuitry includes a first comparator circuit for providing a second electrical signal when the logical page address equals a preselected page address; a fence register for storing a preselected word address; a second comparator circuit for providing a third electrical signal when the ratio of the word address to the contents of the fence register is greater than a first preselected value and less than a second preselected value, in response to the second electrical signal; and
   the selection means includes gating means for providing the logical page address portion of the logical memory address irrespective of the logic state of the first electrical signal, in response to the third electrical signal.

4. The apparatus of claim 3 wherein the translating means comprises groups of addressable storage registers.

5. An apparatus for translating a logical memory address, having a logical page address portion and a word address portion, from a central processing unit into a physical memory address, having a physical page address portion and the word address portion, said apparatus comprising:
- a plurality of translating means for providing the physical page address portion of the physical memory address in response to the logical page address portion of the logical memory address;
- an enabling and addressing circuit coupled to the central processing unit for receiving command signals and the logical page address portion of the logical memory address therefrom, and coupled to the translating means for providing control signals and the logical page address portion of the logical memory address thereto, said enabling and addressing circuit also providing a first electrical signal having a first and a second logic state, said second logic state indicating that one of the plurality of translating means is enabled, said enabling and addressing circuit including a first comparator circuit for providing a second electrical signal to indicate when the logical page address equals a preselected page address; a fence register for storing a preselected word address; a second comparator circuit for providing a third electrical signal when the ratio of the word address to the contents of the fence register is greater than a first preselected value and less than a second preselected value, in response to the second electrical signal; and
- selection means coupled to the translating means for providing the logical page address portion of the logical memory address in response to the first logic state and for providing the physical page address portion of the physical memory address in response to the second logic state of the first signal, said selection means including gating means for providing the logical page address portion of the logical memory address irrespective of the logic state of the first electrical signal in response to the third electrical signal.

6. The apparatus of claim 5 wherein the enabling and addressing circuitry includes a state circuit for storing electrical signals representing the present state of said translating means whenever that state is altered to a new state by said command signals from the central processing unit, said electrical signals being useful for subsequently restoring the translating means to the present state.

7. The apparatus of claim 3 wherein the translating means comprises groups of addressable storage registers.

8. A circuit as in claim 3 wherein the state circuit also includes first circuit means for enabling a preselected translating means in response to control signals which indicate when the central processing unit receives an input/output device interrupt signal.

9. A circuit as in claim 3 wherein the state circuit further includes second circuit means for alternately enabling a first preselected translating means and a second preselected translating means in response to said command signals, said second circuit being useful for executing subroutines in a memory area accessed through one translating means by a program in a memory area accessed through a second translating means and also being useful for transferring data from a memory area accessed through one translating means to a memory area accessed through another translating means.

10. A circuit as in claim 6 wherein the state circuit also includes first circuit means for enabling a preselected translating means in response to control signals which indicate when the central processing unit receives an input/output device interrupt signal.

11. A circuit as in claim 6 wherein the state circuit further includes second circuit means for alternately enabling a first preselected translating means and a second preselected translating means in response to said command signals, second circuit being useful for executing subroutines in a memory area accessed through one translating means by a program in a memory area accessed through a second translating means and also being useful for transferring data from a memory area accessed through one translation means to a memory area accessed through another translating means.

* * * * *

UNITED STATES PATENT AND TRADEMARK OFFICE
CERTIFICATE OF CORRECTION

PATENT NO. : 3,970,999

DATED : July 20, 1976

INVENTOR(S) : John S. Elward

It is certified that error appears in the above-identified patent and that said Letters Patent are hereby corrected as shown below:

Column 3, line 5, "construction" should read --constructed--;

Column 4, line 49, "stage" should read --state--;

Column 6, line 64, "microninstructions" should read --microinstructions--; line 68, "are" should read --area--;

Column 7, line 30, "work" should read --word--; line 39, "use" should read --user--;

Column 8, line 22, "work" should read --word--; line 24, "work" should read --word--; line 25 before "indicates" delete mapped and insert --"mapped"--; line 42, after "use" delete look ahead and insert --"look ahead"--;

Column 11, line 60, after "1017" and "1057" respectively, insert --. . .--; line 61, after "1057" insert --. . .--;

Column 12, line 2, after "If" delete M and insert --"M"--; line 4, after "If" delete N and insert --"N"--;

Column 18, line 62, "port" should read --Port--;

Column 22, line 5, Table VII, Column LABEL, insert --@--;

Column 23, line 2 "not" should read --not--; line 49, "(SFS, SFC" should read --(SFS, SFC)--;

Column 24, line 26, "not" should read --not--;

Column 25, line 26, after "effectively" delete freezing and insert --"freezing"--;

UNITED STATES PATENT AND TRADEMARK OFFICE
CERTIFICATE OF CORRECTION

PATENT NO. : 3,970,999

DATED : July 20, 1976

INVENTOR(S) : John S. Elward

It is certified that error appears in the above-identified patent and that said Letters Patent are hereby corrected as shown below:

Column 26, line 10, after "parenthesis" insert --,followed--; line 13, after "NOP" insert --( )--; line 23, "ASO=C" should read -- ASO=0 ---;

Column 27, line 2, after "B-Register 0." delete the comma (,); line 68, "Register 5" should read --Register 15--;

Column 28, line 1, before the drawing insert --LGS with L1:--;

Column 29, line 46, "The Special" should read --the Special--;

Column 32, line 10, "microin struction" should read --microinstruction--;

Column 33, line 6, "memeory" should read --memory--;

Column 34, line 55, "a" (first occurrence) should read --an--; line 58, after "complement," delete += and insert --"+" ≡ --;

Column 35, line 19, "PSAL" should read --PASL--; lines 28-29, delete --The M Register must be loaded with the addressed of main memory-- (first occurrence);

Column 36, line 11 "M P, P P+1" should read --M←P, P←P+1--;

Column 37, line 55, "SMM,RTN" should read --XMM,RTN--; line 56, "SSM,RTN" should read -- XMM,RTN --;

Column 43, Appendix C, line 0262, "LISTING OF INDLEVEL ROUTINE FOR REFERENCE ONLY" should read --LISTING OF INDLEVEL ROUTINE FOR REFERENCE ONLY--;

Signed and Sealed this

Twenty-ninth Day of March 1977

[SEAL]

Attest:

RUTH C. MASON
Attesting Officer

C. MARSHALL DANN
Commissioner of Patents and Trademarks